Feb. 22, 1944.     N. D. PRESTON     2,342,488
CODED TRACK CIRCUIT SIGNALING SYSTEM
Filed July 16, 1942     8 Sheets-Sheet 1
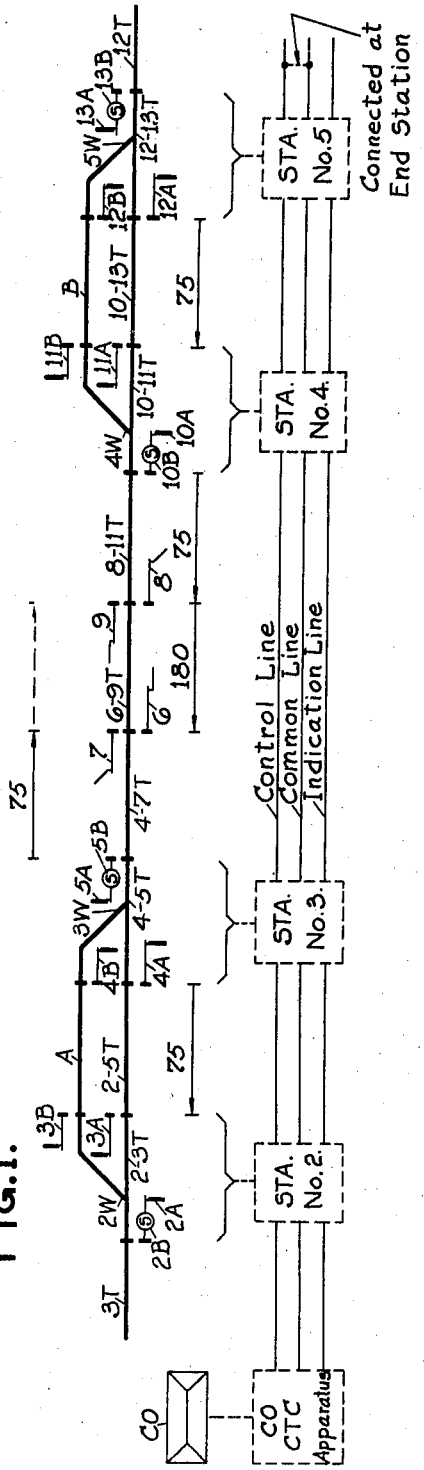
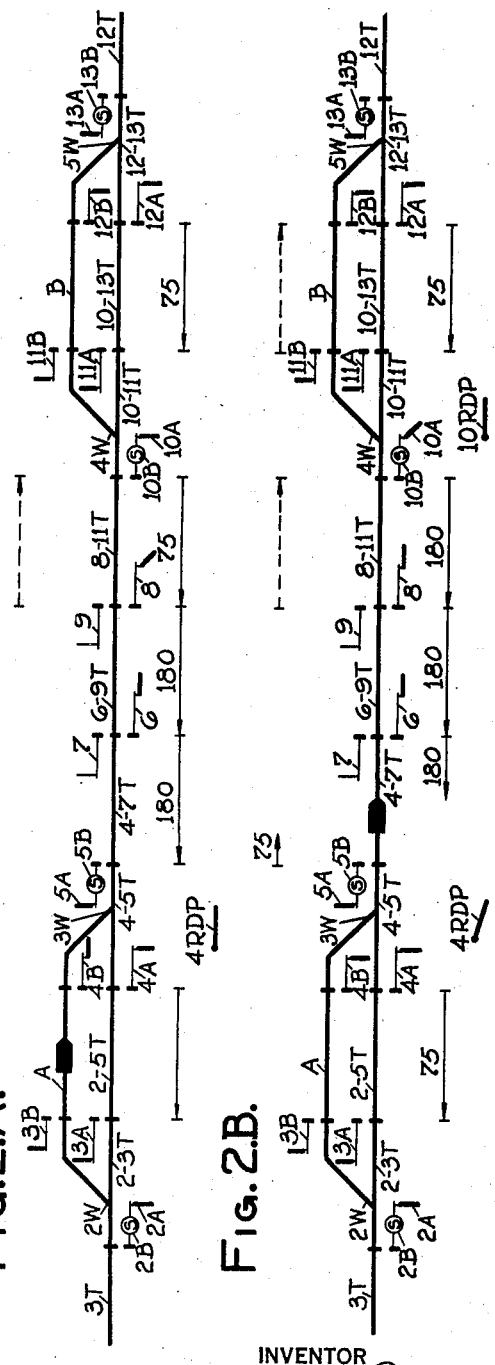
INVENTOR
Neil D. Preston Feb. 22, 1944.     N. D. PRESTON     2,342,488
CODED TRACK CIRCUIT SIGNALING SYSTEM
Filed July 16, 1942     8 Sheets-Sheet 2
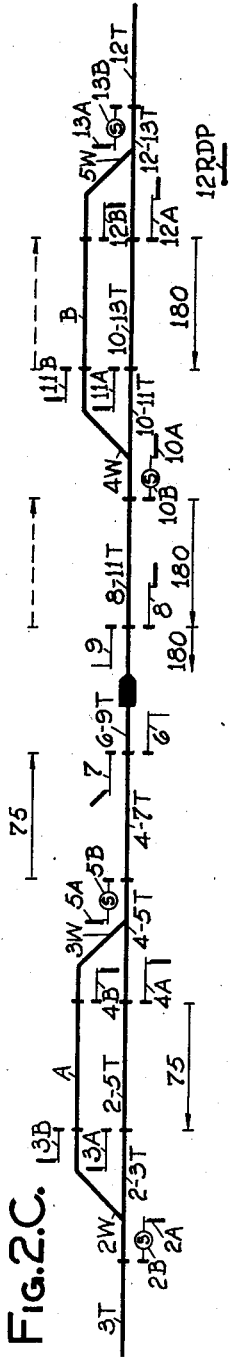
Fig.2.C.
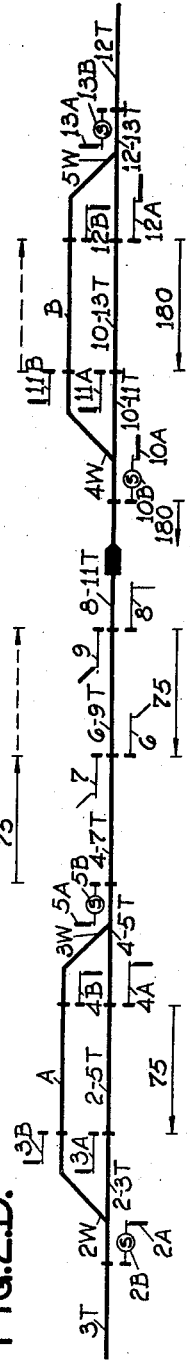
Fig.2.D.
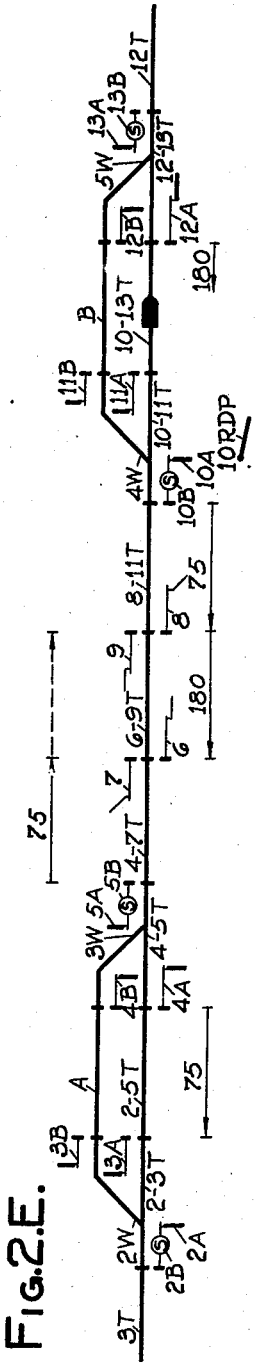
Fig.2.E.
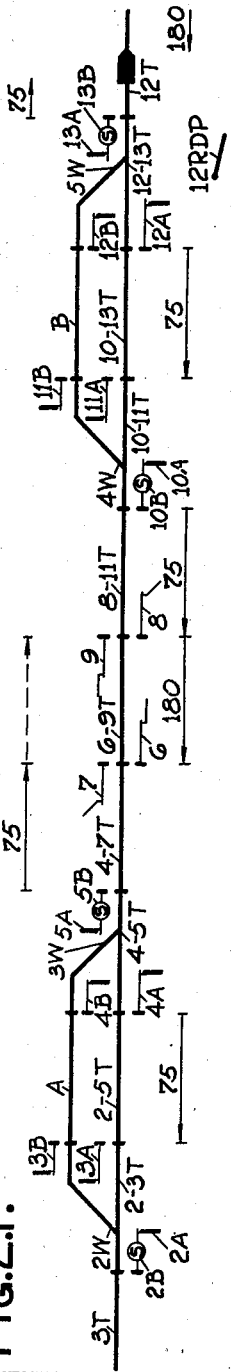
Fig.2.F.
INVENTOR
Neil D. Preston

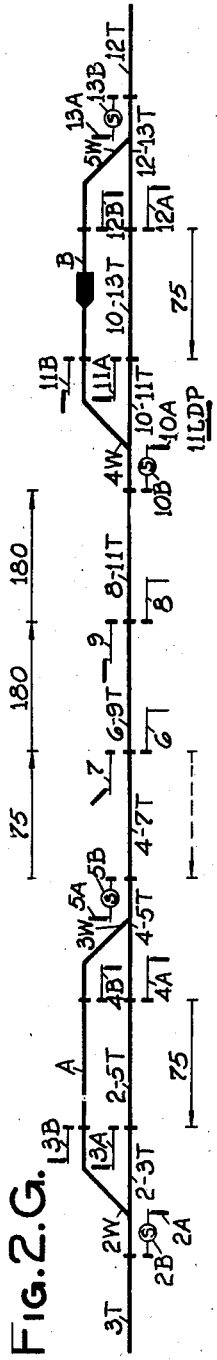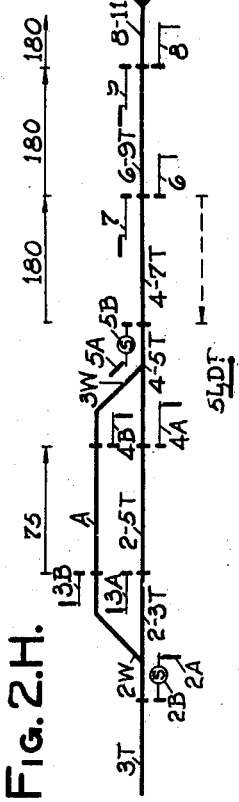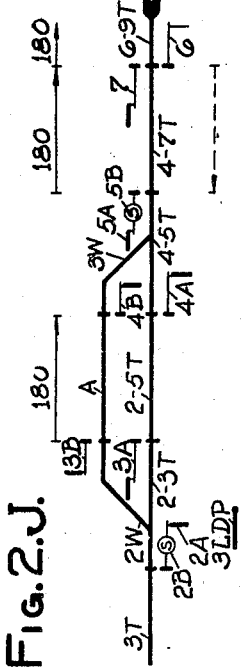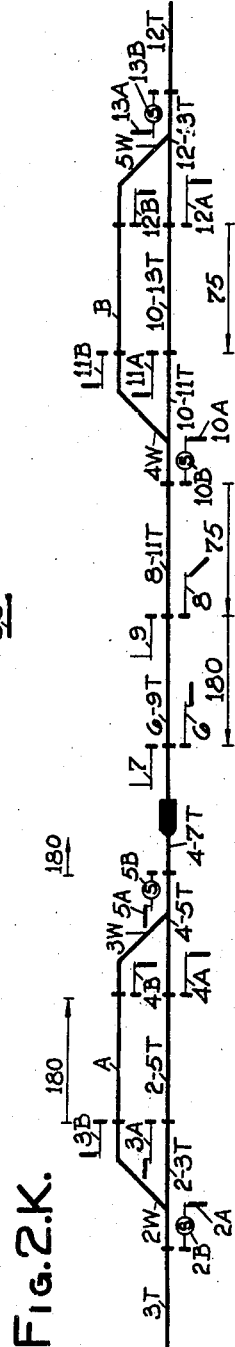

Feb. 22, 1944. N D. PRESTON 2,342,488
CODED TRACK CIRCUIT SIGNALING SYSTEM
Filed July 16, 1942 8 Sheets-Sheet 4

INVENTOR
Neil D. Preston

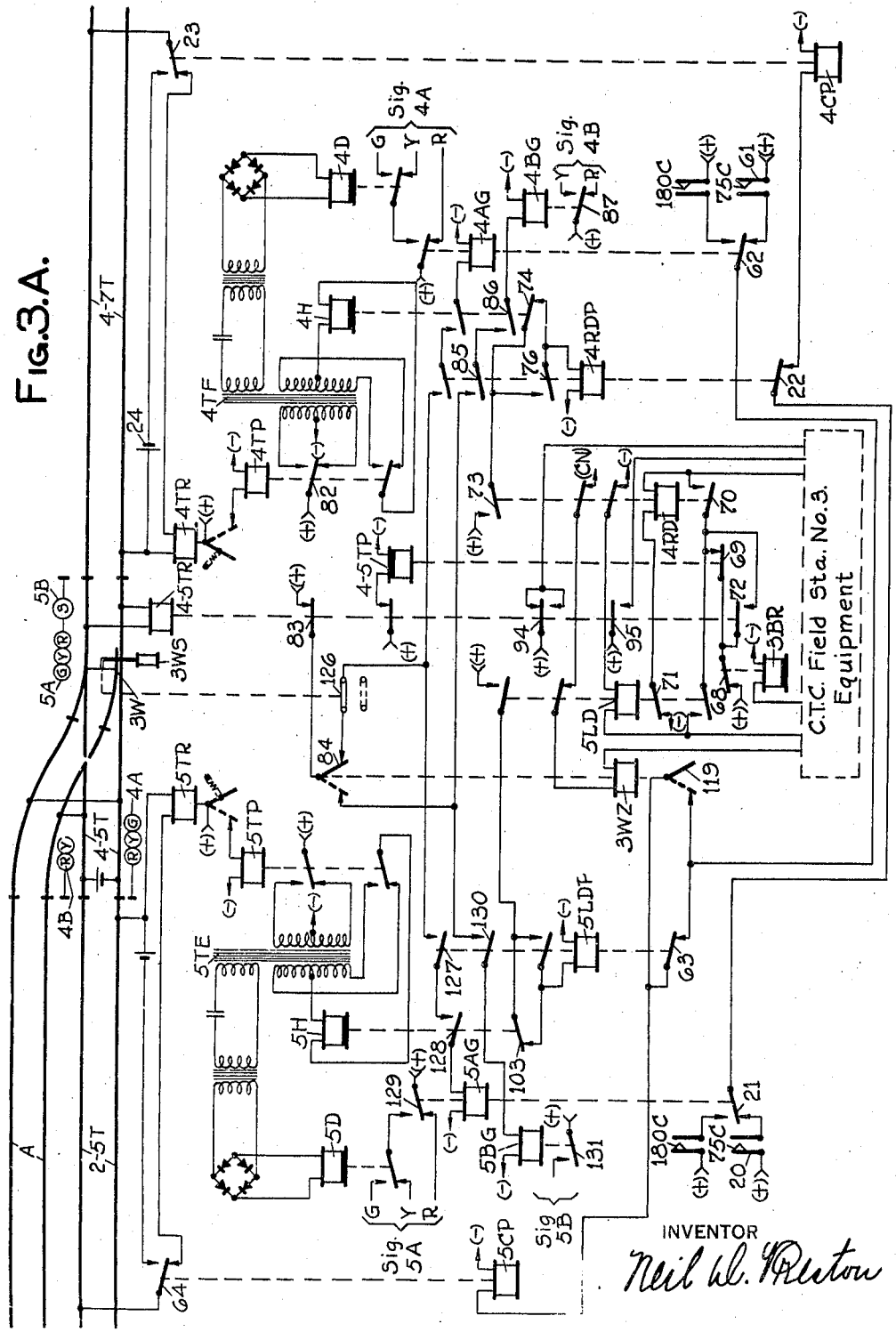

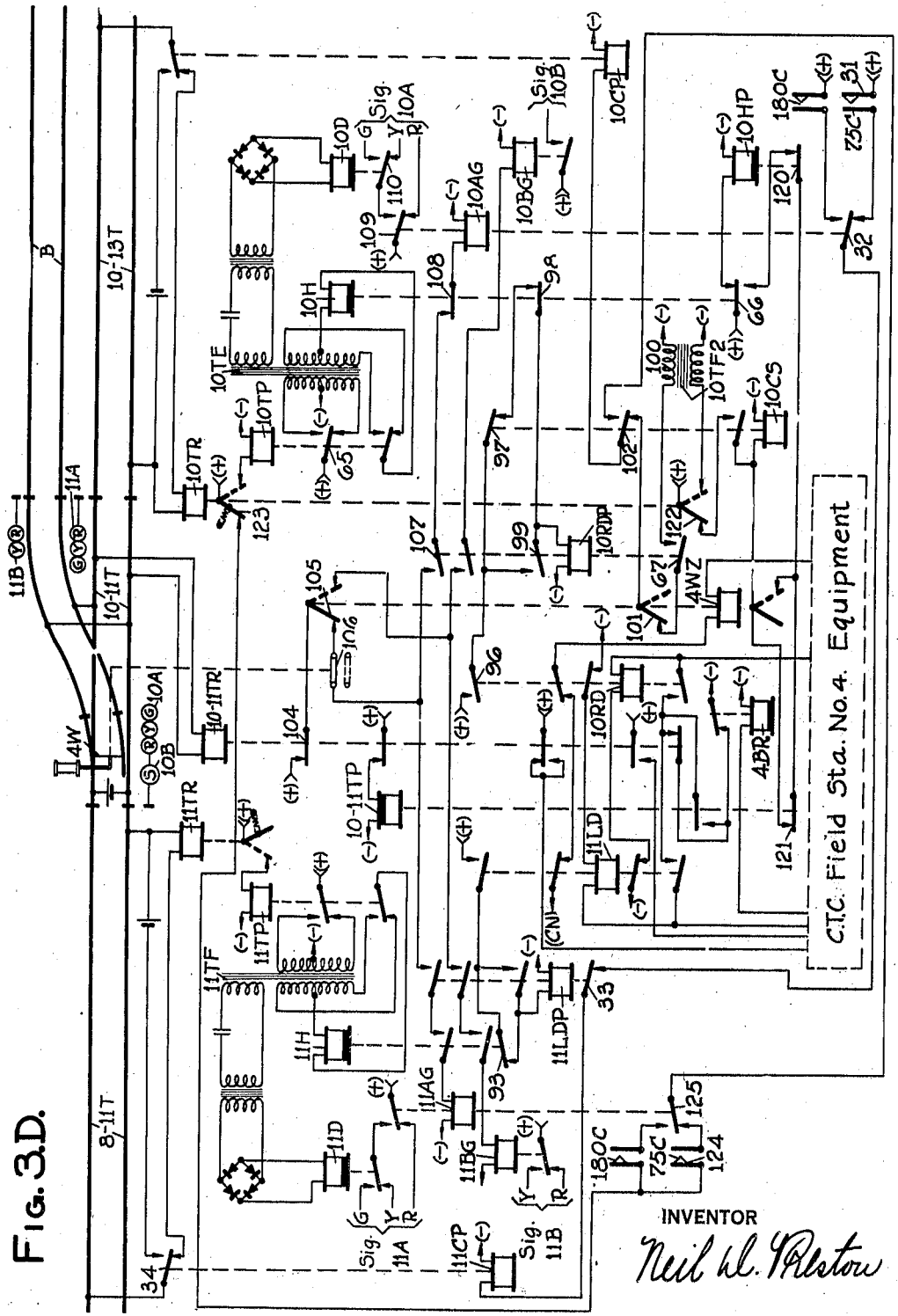

Patented Feb. 22, 1944

2,342,488

UNITED STATES PATENT OFFICE 2,342,488

CODED TRACK CIRCUIT SIGNALING SYSTEM

Neil D. Preston, Rochester, N. Y., assignor to General Railway Signal Company, Rochester, N. Y.

Application July 16, 1942, Serial No. 451,151

32 Claims. (Cl. 246—3)

This invention relates to signal control systems for railroads and it more particularly pertains to centralized traffic control systems in which the automatic control of the signals in the field is accomplished by coded track circuits.

The system of the present invention is organized so that the signals at the ends of the passing sidings of a single track railroad are subject to manual control from a control office with such manual control also being dependent upon automatic signal controls effected by track circuit codes transmitted through the track rails in accordance with traffic conditions in advance. The apparatus associated with each end of a passing siding is said to constitute a field station, and all of the field stations are connected by a code type communication system with the central control office. Although communication can be maintained between the control office and the respective field stations by direct wire control, it is generally preferable from the standpoint of saving line wires that the communication system be of the coded type such as is disclosed, for example, in the patent to Judge et al., Patent No. 2,082,544, dated June 1, 1937, or in the patent to Hailes et al., Patent No. 2,259,561, dated October 21, 1941.

Aside from the line wires used for the code type communication system connecting the field stations with a central office, the automatic signal controls are accomplished entirely by coded track circuits over the track rails of the railroad. In brief, the various stretches of track are divided into insulated track sections or coded track circuits. Each track section is provided with means at one end for transmitting driven codes over the rails of that section toward the opposite end with suitable means at the other end of such section for distinctively responding to the different driven code rates. These driven codes comprise a succession of impulses separated by periods of deenergization which are conveniently termed "off periods," and the driven code impulses are transmitted at different rates in accordance with the different traffic conditions.

At the driven code receiving end of certain track sections, means is provided for transmitting inverse codes. This is accomplished by providing means to apply inverse code impulses to the rails of the track section during the "off periods" of a driven code and these impulses are received at the opposite end of the track section. The apparatus for applying these inverse code impulses is controlled by the means responsive to the driven codes in such a way that the inverse code impulses are synchronized with the driven code impulses and thus are of the same rate. In this connection, it is to be understood that the coded track circuits may be so organized as to have driven codes in either direction at different times as determined in accordance with the conditions of traffic as will be explained in detail hereinafter. This is necessary inasmuch as traffic on a single track railroad must travel in both directions.

One object of the present invention is to govern the direction of code transmission in the various track sections in such a manner as to have the proceed indications of the signals in each established route always dependent upon driven code transmission through the track rails from the exit end of the route, such direction of driven code transmission being automatically established upon the reception of the manual signal control transmitted over the code type communication system from the control office to the proper field station.

Another object of the present invention is to organize the system so that the direction of driven code transmission in the rear of a train will automatically return to a normal or prevailing direction of transmission dependent, of course, upon the manual control exercised by an operator from the central control office. This prevailing direction for each track section is so selected and related to the manual control as to require the reversal of driven code in a minimum number of track sections in order to effect the clearing of the signals for the desired route.

A further object of the invention is to arrange the system so that the transmission of a manual control from the central office to effect the clearing of a signal at a particular field station will so act as to cause the coded track circuit apparatus to permit the clearing of that signal dependent upon traffic conditions without requiring an additional cycle of operation over the coded type communication system to govern the direction of driven codes through the stretch of track over which traffic is to travel. This is a distinct improvement over some prior systems which require two cycles of operation of the code type communication system in order to effect the proper control of the wayside apparatus for clearing any particular signal.

Another object of the present invention is to allow a change in the direction of driven code transmission in an end-section of a stretch of single track to take place only if there is no route established for a train having a signal cleared dependent upon the driven code of such end-section. Such object is fulfilled, for example, by transmitting an inverse code in an end-section when it is desired to maintain a given direction of driven code transmission in such track section, and thereby render ineffective any attempt by an operator at the control office to change the direction of driven code transmission in that end-section.

Another object of the present invention is to establish a normal or prevailing direction of driven code transmission in the intermediate track sections of a stretch of single track between two passing sidings, such direction being automatically reversed as required upon the communication from the control office of a signal control for the clearing of a signal governing entrance to said stretch.

In a single track railroad passing sidings are located at selected intervals. Each passing siding has a stretch of main track conveniently termed a "siding section" and also a stretch of track conveniently termed the "turnout" or "side track." Ordinarily, the side track is not track circuited but in order to obtain proper operation of the signaling system the main track or siding section must have track circuit control. In accordance with the present invention, the siding section of each passing siding is provided with a prevailing direction of driven code for train movement in one direction which driven code may be reversed for train movement in the opposite direction. However, the system is so organized as to prevent this reversal of direction of the prevailing driven code if such siding section is included in a route established for a train movement. This is accomplished by the use of an inverse code being transmitted through the siding section.

Other objects, purposes and characteristic features of the present invention will be in part obvious from the accompanying drawings and in part pointed out as the description of the invention progresses.

In describing the invention in detail, reference will be made to the accompanying drawings in which corresponding reference characters are used to designate corresponding parts throughout the various figures, in which like letter reference characters are used to designate parts having similar features and functions, such parts being generally made distinctive by reason of preceding numerals indicative of the particular locations or functions with which such devices are associated, and in which:

Fig. 1 shows diagrammatically the general organization of one embodiment of the present invention including the general organization of a line circuit code type communication system connecting the respective field stations with the control office, and including a diagrammatic showing of the conditions of driven and inverse code transmission in the coded track circuits under normal conditions;

Figure 3B:
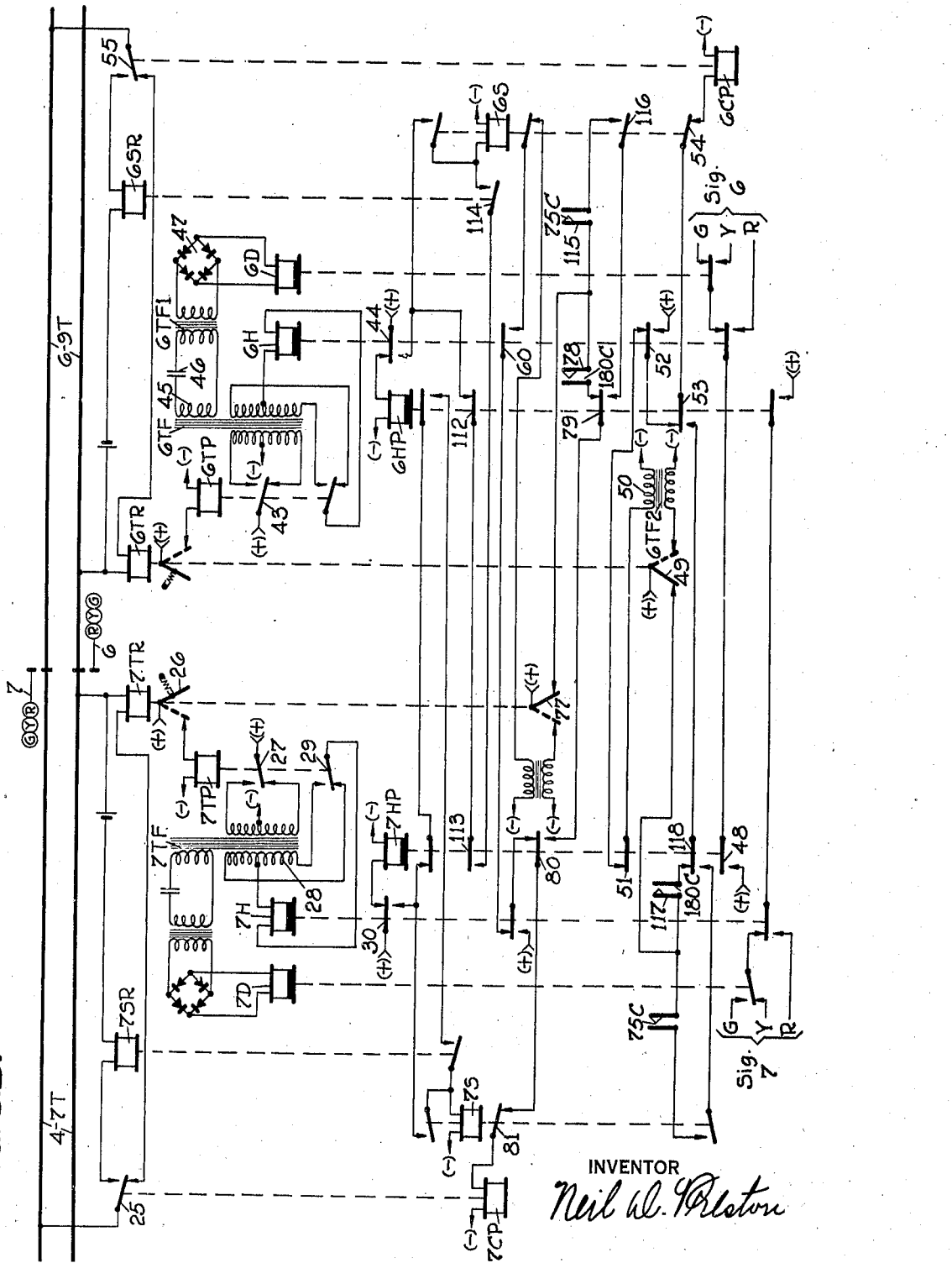
Figure 3C:
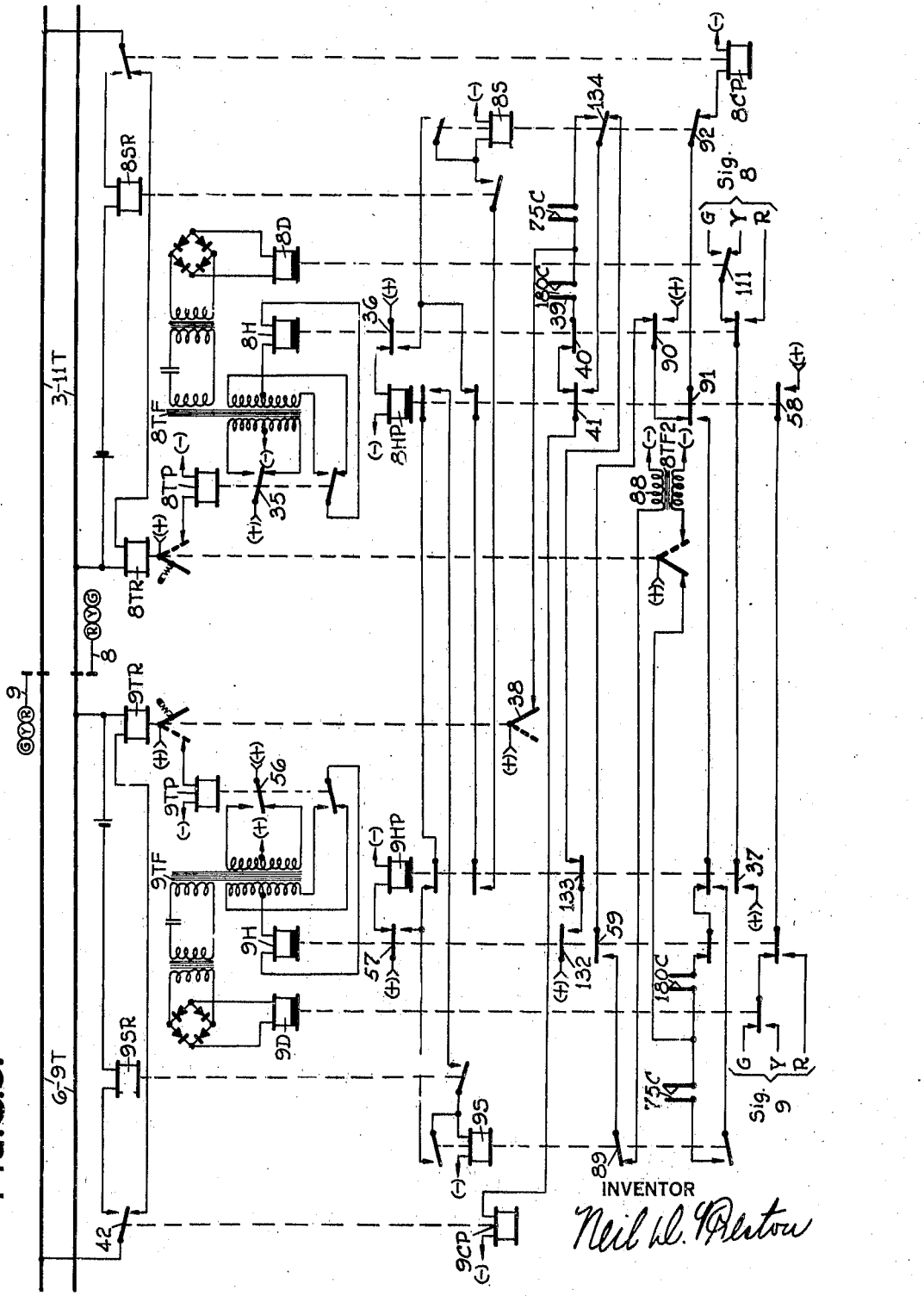

Figs. 3A through 3C when placed end-to-end respectively illustrate the organization of coded track circuit apparatus used for the control of signals associated with a stretch of single track extending between two passing sidings; and Figs. 3D and 3A when placed end-to-end respectively illustrate the organization of coded track circuit apparatus used for the control of entering signals associated with the respective ends of a passing siding.

For this embodiment of the present invention, signals will be considered as being entering signals or leaving signals with respect to the passing siding with which they are associated. Thus, a leaving signal or head-block signal governs passage of a train into a stretch of single track extending between passing siding, while an entering signal governs train movements into the siding section or onto the side track.

Various circuits and devices constituting this embodiment of the present invention have been shown diagrammatically for the purpose of simplifying the illustration and facilitating in the explanation of the present invention, rather than for the purpose of showing the specific construction and arrangement of such circuits and devices that would be employed in practice. Thus, the various relays and their contacts are illustrated in a conventional manner and symbols are used to indicate connections to the terminals of batteries or other sources of electric current instead of showing all of the wiring connections to such terminals.

The symbols (+) and (−) are employed to indicate the positive and negative terminals respectively of suitable batteries or other sources of direct current, and the circuits with which such symbols are used always have current flowing in the same direction. The symbols (B+) and (B−) may be used to designate respective positive and negative terminals of a battery having a center tap (CN), and the circuits with which such symbols are used have current flowing in one direction or the other dependent upon which of the battery terminals is used in combination with the center terminal (CN).

In order to simplify the description of the present invention reference is made from time to time to functions common to all parts of a similar character by use of the letter reference characters common to such parts without their preceding numerals. It is to be understood that such a reference applied to any parts designated in the drawings by reference characters that are similar except for numerals associated therewith.

*Track layout.*—With reference to Fig. 1, the track layout of this embodiment of the present invention is illustrated as comprising a stretch of single track having passing sidings A and B associated therewith so as to include a stretch of single track having several track sections between the two passing sidings. Each end of each of the passing sidings is connected to the main track by a spring switch mechanism as illustrated for the track switch 3W in Fig. 3A. The track switch 3W is normally positioned for main track movements, but can be hand operated to a reverse position for train movements onto the side track. The switch is provided with a spring and dash-pot arrangement 3WS which gives it a bias to the position for which it is set, but permits it to be trailed in the opposite position. This is the usual arrangement for spring switches. It is preferable for safety purposes that the spring switches be provided with facing point locking mechanisms such as is shown, for example, in the application of O. S. Field, Ser. No. 368,034, filed November 30, 1940.

Short detector track sections are provided at each end of each of the passing sidings for each of the spring switches such, for example, as the track section 4—5T associated with the track switch 3W. Each of the detector track sections has a track circuit of the steadily energized type normally employed in practice.

The signals provided for governing the passage of trains in both directions over each of the track switches are subject to manual control from the control office, and therefore such signals are normally at stop. The arrangement of the signals at each end of each of the passing sidings is in accordance with the usual practice, the signals 5A and 5B, for example, being provided for governing westbound traffic (to the left) through the track section 4—5T, and the signals 4A and 4B being provided for governing eastbound traffic (to the right) through the track section 4—5T. The signal 5B is what may be conveniently termed a "take siding signal" inasmuch as it is illuminated only when the train is to stop and have a trainman operate the switch to the reverse position so that the train can then proceed onto the side track. Automatic intermediate signals are provided for governing traffic in each direction through the stretch of single track between the sidings A and B, the signals 6 and 8 being provided for governing eastbound traffic, and the signals 7 and 9 being provided for governing westbound traffic.

The signals illustrated in this embodiment of the present invention are of the color light type having individual color lamp units, but it is to be understood that other types of signals such as search light, semaphore, and position light signals can as well be employed. The signal indications are displayed in the usual manner, a red indication being employed for danger or stop, a yellow indication for caution, and a green indication for clear.

For convenience in illustrating the indications displayed by the various signals, and the conditions of the apparatus for controlling such signals, symbols have been used in the diagrams of Fig. 1 and Figs. 2A through 2M comparable to the various positions of the arm of a semaphore signal. In these diagrams, certain of the signal arms have been shown heavy to indicate when the signal lamps are illuminated, and certain of the signal arms are shown relatively light to indicate the condition of the apparatus for providing an indication but to indicate that such signals do not actually display indications under the assumed conditions. The signal symbols thus employed are to be considered as indicative of signal indications rather than of a particular type of signal.

Aside from the steadily energized detector track sections for the various track switches, the trackway is divided into track sections so as to provide a siding section 2—5T associated with the passing siding A, and a track siding section 10—13T associated with the passing siding B. The track extending between the passing sidings A and B is divided into track sections 4—7T, 6—9T, and 8—11T. Each of these track sections is provided with coded track circuit apparatus for the transmission of controls in either direction.

It is to be understood, and it will be readily apparent as the description progresses, that the present invention is applicable to most trackways to be encountered in practice for the installation of a centralized traffic control system, the conditions disclosed in this embodiment of the present invention with respect to a particular portion of trackway being typical of conditions that can be applied in whole or in part to track layouts having a different arrangement of signals, and a different number of track sections extending between passing sidings.

*Communication system.*—Inasmuch as the present invention is adaptable for use with most communication systems for centralized traffic control commonly known to those skilled in the art, the details of a line circuit code type communication system connecting the control office with the respective field stations has not been shown. A system has been illustrated diagrammatically, however (see Fig. 1), where control and indication line circuits connect the apparatus at a control office CO with the apparatus at the respective field stations Nos. 2, 3, 4 and 5. The communication system thus indicated can correspond to that disclosed in detail in my prior application Ser. No. 439,520, filed April 18, 1942, and specifically described in the above mentioned patent to Judge et al., Patent No. 2,082,544, dated June 1, 1937.

The control office apparatus of such code type communication system comprises a track diagram on a control panel corresponding to the trackway in the field for which the system is provided along which are disposed switch and signal control levers for the respective field stations for manual designation of switch and signal controls to be communicated to the respective field stations. Responsive to the positioning of the levers for the clearing of a signal governing traffic over the track switch at one end of a passing siding, the system can be initiated into a control cycle of operation for communication of the controls thus designated to the field station for which such controls are intended. The impulses transmitted during the control cycle form a composite code, the first portion of which selects a particular field station to receive the controls, and the last portion of which is used for the communication of the particular controls which have been selected for transmission.

At each of the field stations, code receiving apparatus is provided so as to cause each station to receive switch and signal controls communicated from the control office only if such station has been called by the station selecting portion of the control cycle. The reception of switch and signal controls at each of the field stations causes the distinctive conditioning of switch and signal control relays at such station such, for example, as the relays 3WZ, 5LD, 4RD, and 3R shown in Fig. 3A for field station No. 3. The polar relay 3WZ replaces the normal and reverse neutral relays WN and WR which were shown in my prior application Ser. No. 439,520, filed April 18, 1942, but a corresponding WZ relay is shown in the above mentioned Judge et. al. patent, No. 2,082,544, dated June 1, 1937.

The relay 5LD is picked up when a control is communicated from the control office for the clearing of signal 5A or signal 5B for governing traffic to the left, and the picking up of relay 4RD is effected when a control is communicated from the control office for the clearing of signal 4A or signal 4B. The relay 3R is momentarily energized when a control is communicated from the control office for causing the putting to stop of a signal at field station No. 3, which is accomplished by deenergizing the stick circuits of the relays 4RD and 5LD. The relay 3WZ is energized with a particular polarity upon the reception of a code at field station No. 3 for the selection of the normal position of the track switch 3W, and it is energized with the opposite polarity when a control is received from the control office for selecting the reverse position.

The line circuit code type communication system connecting the control office and the respective field stations has apparatus for the communication of indications from the respective field stations to the control office as to the conditions of the signals and the conditions of occupancy of the OS track sections. The communication of such indications is fully disclosed in the above mentioned Judge et al. patent.

*Track circuit and signal control devices.*—Each of the track sections other than the OS or detector track sections has a code following track relay TR, a repeater relay TP, which follows the coding of the relay TR with which it is associated, code receiving relays H, HP and D, and a code transmitter relay CP. Each of the track relays TR is preferably of a polar structure and has its armature biased to a particular position by means of such structure in order to cause the relay to be responsive to only a particular polarity of energization of the track circuit with which it is associated. Such polarization is generally desirable in order to improve the operating characteristics of the track circuit code communication system. It is desirable in actual practice that track repeater relays TP be employed, although theoretically the relays TP could be eliminated and the circuits which they govern could be governed by similar contacts of the respective track relays TR. In this way, the track relays can be made more sensitive to track circuit conditions to make relatively long track circuits possible.

Each relay TP is a quick acting neutral relay adapted to follow the code received by the track relay TR with which it is associated, while each of the H relays is slow-acting and adapted to be maintained picked up whenever a code is received at the end of the track section with which it is associated, such relay being energized through the medium of a transformer TF. Each of the relays D has a tuned circuit to provide that such relay D is picked up only upon the reception at that end of the track section of a particular track circuit code which in this embodiment of the present invention is a code of 180 impulses per minute. Each of the code transmitter relays CP is a quick acting neutral relay adapted to follow the pulsing of a code oscillator or motor driven coder for the transmission of a driven code, or to be pulsed for the transmission of an inverse code where conditions provide for the transmission of an inverse code.

An impulse forming device, such as an oscillator having a magnetically rotated balance acting in opposition to a clock spring to provide an oscillating operation, is provided at each signal location for each code desired to be transmitted from such location. Therefore, each of the signal locations has an oscillator 180C for forming impulses at the rate of 180 impulses per minute, and each signal location has an oscillator 75C for forming impulses at the rate of 75 impulses per minute, as these are the impulse rates employed in this embodiment of the present invention.

A signal control relay AG or BG is provided for governing each of the signals at the respective field stations, and the field station at the left-hand end of each of the passing siding has associated therewith a relay CS used in connection with the reversal in the direction of driven code transmission in the track section of the main track included between the ends of the passing siding.

At each of the intermediate signal locations directional stick relays S are provided for governing the transmission of codes for following trains as disclosed in my prior application, Ser. No. 413,021, dated September 30, 1941, such relays having associated therewith for their control series relays SR included in the track circuits.

Having considered the apparatus provided for this embodiment of the present invention together with the general function of the various devices, it is believed that further description of the present invention can best be set forth from the standpoint of operation under various typical traffic conditions.

Operation

Figure 2L:
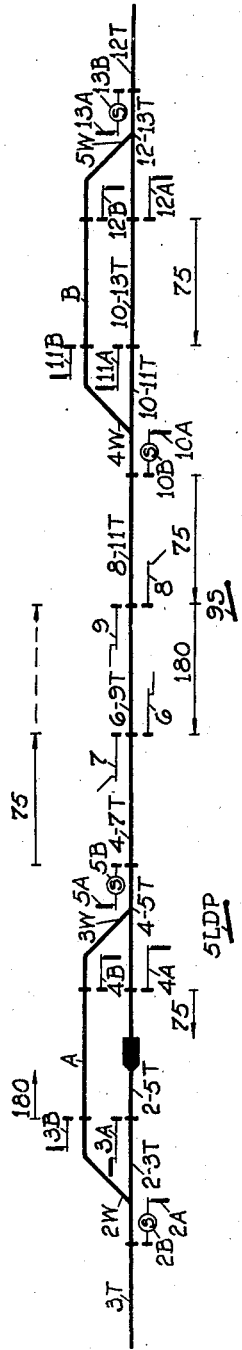
Figs. 2A through 2N (letter I omitted) illustrate diagrammatically conditions of track circuit code transmission which prevail under various typical traffic conditions for both directions of traffic.
Figure 2M:
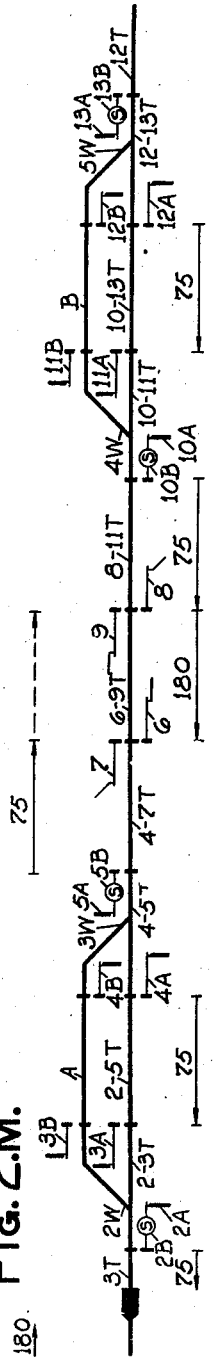
Figure 2N:
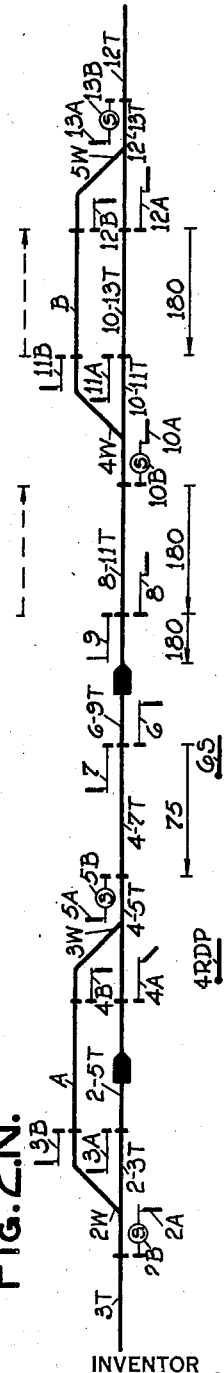

*General.*—It is believed expedient, before considering the details of the circuits employed in the system, to consider the general mode of operation under certain typical operating conditions and some of the reasons for providing such mode of operation with special reference to the diagrams of the operation shown in Figs. 1, 2A to 2N.

With reference to Fig. 1, the normal conditions of code transmission are illustrated, and it is to these conditions that the system is restored after passage of a train in either direction. It will be noted that a 75 driven code is normally transmitted in the respective end sections 4—7T and 8—11T toward the center of the stretch of track between the passing sidings A and B; while a 180 driven code is transmitted through the intermediate track section 6—9T from right to left together with an inverse code transmitted from left to right. As will be noted in this Fig. 1, the driven codes are represented in the diagrams by arrows with solid line shafts, but the inverse codes are represented by arrows with dotted line shafts. The driven codes may be of different distinctive code rates, such as 75 pulses per minute and 180 pulses per minute, and these different code rates are produced by suitable coders or code oscillators at the end of the track section where the driven code originates. These driven codes, illustrated by the arrows with solid line shafts, have been indicated in the diagrams as having particular rates under the conditions assumed for any one diagram by associating therewith the number 75 or 180 as the case may be. However, inasmuch as the inverse codes are produced as a result of their associated driven codes, and always take the rates of such driven codes, no rate designation has been associated with the arrows having dotted line shafts to indicate the presence of such inverse codes.

At the intermediate signal locations, the driven or inverse code transmitted away from any given intermediate signal location is dependent upon the reception of code at that signal location over the adjacent track section. For example, the 180 driven code in the track section 6—9T (see Fig. 1) is dependent upon the reception of the 75 driven code over the track section 8—11T. Similarly, the inverse code of track section 6—9T shown in Fig. 1 is dependent upon the reception of the 75 driven code in section 4—7T.

In brief, the driven codes in the various track sections are normally transmitted in a prevailing direction while no head-block signals are cleared and no trains are present. The prevailing direction for the end track sections, such as 4—7T and 8—11T for the single track stretches, is so selected that the driven codes in those sections are transmitted away from the head-block signal locations. Also, the cessation of code transmission from a particular head-block signal location, causes the cessation of the code transmission for the same direction in the intermediate track section, because the driven code in the intermediate track section 6—9T is dependent upon the driven code in the end track section 8—11T; and similarly, the inverse code in the intermediate track section is dependent upon the driven code in the end track section 4—7T. For example, if the signal 4A or the signal 4B were to be cleared, the 75 driven code in the track section 4—7T would be stopped, which in turn would cause the cessation of the inverse code in the section 6—9T. This has been illustrated in the diagram of Fig. 2A, it being assumed for the purposes of this diagram that the 75 driven code in the track section 4—7T is stopped due to the clear manual control for the signal 4B.

In Fig. 2A, it will be seen that the driven code for the track section 4—7T is now reversed but the driven codes for the track sections 6—9T and 8—11T are in the proper direction for effecting control of the head-block signals 4A and 4B. An inverse code is caused to be transmitted in the end track section 8—11T because of the cessation of the inverse code in the adjoining track section. The manual control for the signal 4B, indicated as being clear in Fig. 2A, is assumed to have been transmitted over the line wires of the centralized traffic controlling communication system effecting a proper operation of electroresponsive means at the field station No. 3 for causing the clearing of the signal 4B for the passage of an eastbound train out of the siding A.

The normal direction of driven code transmission in the intermediate track section 6—9T is from right to left as illustrated in Fig. 1, and the transmission under normal conditions of an inverse code in that track section prevents the transmission of an inverse code in the end section 8—11T. The absence of such code gives the field station No. 4 permission to cause a reversal in the direction of driven code transmission in the section 8—11T if it is desired to clear a signal for governing the passage of a westbound train at such field station. In a similar manner the reception of the 180 driven code at the left-hand end of the track section 6—9T prevents the transmission of an inverse code in the track section 4—7T, and thus the field station No. 3 is given permission to reverse the direction of driven code transmission in the track section 4—7T if it is desired to clear an eastbound signal at such field station.

With reference to Fig. 2A in which it is assumed that an operator at the control office has caused the transmission of a signal control for clearing the signal 4B for passage of an eastbound train out of the siding A, it will be noted that the picking up of the relay 4RDP which is responsive to the control office for governing the clearing of signals to the right for that field station is the condition which is responsible for the reversal in the direction of driven code transmission in the end track section 4—7T. The removal of the 75 driven code normally transmitted from left to right in that track section causes the removal of the inverse code in the intermediate section 6—9T, and the removal of that code in turn renders the transmission of an inverse code in the track section 8—11T to be effective.

The reception at the right-hand end of the track section 8—11T of such inverse code prevents a reversal in the direction of driven code transmission in the track section 8—11T in case an operator should inadvertently cause the communication of a control to field station No. 4 for causing the clearing of a signal for westbound traffic. Such arrangement therefore provides means for preventing the taking away of code in the track section 8—11T in advance of the eastbound train. This is true because the inverse code is maintained in such end track section 8—11T until that track section becomes occupied by the eastbound train as illustrated in Fig. 2D.

It will be noted in Fig. 2B that the progress of an eastbound train through the track section 4—7T allows the restoration of the 75 driven code normally transmitted from left to right in the track section, such code being restored because of the dropping of the office controlled relay 4RDP upon passage of the eastbound train through the track section 4—5T. Obviously, there is a code fight in the track section 4—7T when such track section becomes unoccupied in the rear of an eastbound train, and the 75 code transmitted from the left-hand end of the track section 4—7T is made superior so as to overrule the code applied in the rear of the eastbound train in a manner described in detail hereinafter. If a route were set up, however, for a following train, the transmission of a 75 driven code from right to left in the track section 4—7T would be effected because the relay 4RDP would then be picked up, and the picking up of such relay renders the transmission of a 75 driven code in the track section 4—7T from left to right to be ineffective (see diagram of Fig. 2N).

With reference to Fig. 2C, it will be noted that there is no code applied to the track section 6—9T to follow the eastbound train and there has has been no reversal in the direction of driven code transmission in such intermediate section, the normal direction of driven code transmission being from right to left. When such track section becomes unoccupied in the rear of a train, as illustrated in Fig. 2D, a 75 driven code is transmitted from right to left in the track section 6—9T in accordance with the occupancy of the eastbound train of the track section 8—11T, and an inverse code is restored for the track section 6—9T because of the reception of a code at the right-hand end of the track section 4—7T.

It will be noted according to Fig. 2B that a signal control has been communicated from the control office for the picking up of the relay 10RDP for clearing the signal 10A, and the picking up of that relay is effective to cause the transmission of an inverse code in the track section 10—13T associated with the passing siding B. The transmission of such inverse code is for the purpose of preventing the removal of the driven code transmitted from right to left in the track section 10—13T if an operator inadvertently causes the transmission of a control from the control office for the clearing of signal 13A which would attempt to reverse the direction of driven code transmission in the track section 10—13T.

Upon passage of the eastbound train out of the track section 8—11T, the normal conditions of code transmission are restored in that track section as illustrated in Fig. 2E, and similarly upon passage of the train out of the track section 10—13T the normal conditions of code transmission are restored for such track section. It will be noted that there is no code fight in either of these track sections because the direction of code transmission for the passage of the eastbound train has not been changed from that normally provided in those track sections.

Although a much similar mode of operation is effective upon the passage of a westbound train, the conditions of track circuit code transmission for certain of the track sections are somewhat different from those effective for the passage of an eastbound train, and a brief consideration will now be given to those conditions as illustrated in Figs. 2G through 2M.

With reference to Fig. 2G a condition has been illustrated in which the relay 11LDP has been picked up by a control communicated from the control office for the clearing of signal 11B for governing passage of the westbound train out of the siding B. The picking up of relay 11LDP causes the removal of the 75 driven code normally transmitted from right to left in track section 8—11T, and the removal of such code causes the removal of the 180 driven code normally transmitted from right to left in the track section 6—9T. In accordance with the removal of those codes, the opposite direction of driven code transmission is established in the track sections 6—9T and 8—11T so as to transmit in the direction of the siding B.

When the westbound train leaves the passing siding B, the relay 11LDP is dropped away, and the dropping away of such relay causes the transmission of a 75 driven code from right to left in the track section 8—11T in the rear of the train as a step toward the restoration of the normal conditions. When the track section 8—11T becomes unoccupied in the rear of the westbound train, a code fight in the track section 8—11T is solved in favor of the 75 driven code normally transmitted from right to left in such track section, and the restoration of such code causes the track circuit code transmitter for the track section 6—9T to be active for the transmission of a driven code from right to left in that track section in the rear of the train as a step toward the restoration to normal conditions for such track section.

When the track section 6—9T becomes unoccupied in the rear of the westbound train, a code fight is solved in such track section in favor of the code normally transmitted from right to left, but the presence of the westbound train in the track section 4—7T prevents the transmission of an inverse code from left to right in the track section 6—9T. An inverse code is not transmitted from left to right in the track section 8—11T due to the absence of inverse code in the track section 6—9T because the directional stick relay 9S for the signal 9 is maintained picked up until the inverse code for the intermediate track section 6—9T is transmitted. Thus by the absence of an inverse code in the track section 8—11T permission is given for the reversal in the direction of driven code transmission in the end section 8—11T if it is desired to establish a route for a following westbound train.

With reference to Fig. 2L, when the end track section 4—7T becomes unoccupied in the rear of the westbound train, the reception of the 75 driven code at the right-hand end of such track section causes the restoration of the inverse code in the track section 6—9T, and the reception of such code at the right-hand end of that track section allows the restoration of the directional stick relay 9S for the signal 9, and the reception of such code is effective to prevent the transmission of an inverse code in the track section 8—11T.

It will be noted in Fig. 2H that the picking up of the relay 5LDP for the clearing of signal 5A is effective to stop the transmission of the 75 driven code normally transmitted from right to left in the track section 2—5T associated with the passing siding A, and thereby to cause the reversal in the direction of driven code transmission in such track section. As the westbound train proceeds through the track section 2—5T as illustrated in Fig. 2L, a 75 driven code is transmitted in the rear of the train in an attempt to restore the normal conditions of the system, and such code prevails as the result of a code fight when the track section 2—5T becomes unoccupied in the rear of the westbound train, thus completing the restoration to normal conditions of the conditions of track circuit code transmission as shown in Fig. 2M.

Having thus given brief consideration to the general mode of operation of the system upon passage of eastbound and westbound trains, a detail description will now be set forth as to the specific means employed for providing such mode of operation.

*Normal conditions.*—Under normal conditions a 75 driven code is transmitted from right to left in the track section 4—7T because of the energization of the code transmitter relay 4CP (see Fig. 3A) for each impulse of the oscillator 75C by a circuit closed from (+), including contact 20 of oscillator 75C, back contact 21 of relay 5AG, back contact 22 of relay 4RDP, and winding of relay 4CP, to (—).

The closure of front contact 23 of relay 4CP for each impulse of the 75 code causes the energization of a track circuit for the track section 4—7T extending from the positive terminal of track battery 24 including front contact 23 of relay 4CP, upper rail of track section 4—7T (see Fig. 3B), back contact 25 of relay 7CP, winding of relay 7TR, and lower rail of track section 4—7T to the negative terminal of track battery 24 (see Fig. 3A).

The pulsing of contact 26 of relay 7TR (see Fig. 3B) at the right-hand end of track section 4—7T upon the reception of the 75 driven code causes the relay 7TP to follow the code, and the pulsing of contact 27 of relay 7TP causes the primary winding of the transformer 7TF to be energized first with one polarity and then the other to induce an alternating voltage in the secondary windings of the transformer. The alternating voltage induced in the secondary winding 28 of transformer 7TF provides for the energization by direct current of the relay 7H through the medium of the rectifying contact 29 of relay 7TP in a manner well known to those familiar with the art. The relay 7H is therefore energized upon the reception of either a 180 or a 75 code at the right-hand end of the track section 4—7T. The repeater relay 7HP is normally energized by the closure of front contact 30 of relay 7H. The energization of the relay 7H conditions the signal 7 to indicate caution, but the energization of the yellow lamp of such signal can become effective only when the relay 6HP for the opposing signal is deenergized.

To summarize the operation of this coded track circuit 4—7T which is typical of the operation of the other track circuits, it will be seen that the operation of the code transmitting relay 4CP is effective to apply code pulses to the track rails which operate only the track relay 7TR at the opposite end of the track circuit; and similarly, under conditions later explained, the operation of the code transmitting relay 7CP at the opposite end of the track circuit is effective to apply code pulses to the track rails which will operate only the track relay 4TR. In this way, code pulses are transmitted in each direction through the track circuit as required in accordance with the operating conditions of the system which will be pointed out in connection with the description as it progresses.

For the end section 8—11T at the right-hand end of the stretch of single track extending between the passing sidings A and B, a 75 driven code is transmitted from right to left in such track section because of the energization for each impulse of the oscillator 75C (see Fig. 3D) at the right-hand end of such track section of a circuit extending from (+), including contact 31 of oscillator 75C, back contact 32 of relay 10AG, back contact 33 of relay 11LDP, and winding of relay 11CP, to (—). The pulsing of contact 34 of relay 11CP is effective to cause the transmission of a driven code in the track section 8—11T by the energization of a track circuit corresponding to that which has been described for the track section 4—7T, and the reception of such code at the left-hand end of that track section causes the relay 8TP (see Fig. 3C) to pulse contact 35 and thereby cause the relay 8H to be picked up through the medium of the decoding transformer 8TF in a manner corresponding to that which has been described for the energization of the relay 7H. The relay 8HP is energized because of the closure of front contact 36 of relay 8H.

The energization of the relay 8H with the relay 8D dropped away conditions the signal 8 for a caution indication, but the yellow lamp of such signal cannot be illuminated because of the energized condition of a relay 9HP to open the circuit for such signal lamp at back contact 37.

In accordance with the energized condition of the relays 8H and 8HP, the relay 9CP is normally active for the transmission of a 180 driven code from right to left in the track section 6—9T because of its energization for each impulse of the oscillator 180C by a circuit extending from (+), including contact 38 of relay 9TR in its right-hand position, contact 39 of oscillator 180C, front contact 40 of relay 8H, front contact 41 of relay 8HP, and winding of relay 9CP, to (—). The pulsing of contact 42 of relay 9CP causes the energization of a track circuit for the track section 6—9T corresponding to the circuit that has been described in detail for the track section 4—7T except that the series relay 9SR is included in series with the track battery. Such series relay is employed in the control of the directional stick relay 9S in a manner which will be hereinafter described.

The reception at the left-hand end of the track section 6—9T of the 180 driven code causes the relay 6TP (see Fig. 3B) to pulse contact 43 and thereby effect the energization of the relay 6H through the medium of the decoding transformer 6TF. The closure of front contact 44 of relay 6H causes the relay 6HP to be energized. Inasmuch as a 180 code is received at the left-hand end of the track section 6—9T, sufficient current flows in the tuned circuit for the relay 6D including the secondary winding 45 of transformer 6TF, condenser 46, transformer 6TF1, and full-wave rectifier 47. The energization of the relays 6H and 6D conditions the signal 6 to be clear, but the green lamp of such signal is not illuminated because of its circuit being open at back contact 48 of relay 7HP.

The relay 6CP is active for the transmission of an inverse code from left to right in the track section 6—9T under normal conditions because its circuit is closed and is inductively energized by the collapse of flux in the transformer 6TF2 each time the contact 49 of relay 6TR is opened at the end of a driven code impulse received at the left-hand end of track section 6—9T. The circuit by which the relay 6CP is picked up for the transmission of each impulse of an inverse code is closed from the left-hand terminal of the secondary winding 50 of transformer 6TF2 including front contact 51 of relay 7HP, front contact 52 of relay 6H, front contact 53 of relay 6HP, back contact 54 of relay 6S, and winding of relay 6CP, to the opposite terminal of the secondary winding 50 of transformer 6TF2.

The pulsing of contact 55 of relay 6CP for the transmission of an inverse code in the track section 6—9T causes impulses to be applied to its associated track circuit in a manner similar to that which has been already described for the track section 4—7T. This track circuit for section 6—9T includes the series relay 6SR which is used in the control of the stick relay 6S for reasons later explained. In brief, the cessation of each driven code pulse in the track section 6—9T causes an inductive energization of relay 6CP to apply an inverse code pulse to the track rails. Such inverse code pulse applied to the track circuit is only momentary and ceases before the next driven code pulse is applied at the opposite end of the track circuit. Thus, the relay 6CP is deenergized in time to permit the track relay 6TR to receive the next driven code pulse. In this way, the pulses of an inverse code are transmitted between the pulses of a driven code without interfering therewith, and the inverse code is thus caused to have pulses at the same rate as the driven code which is causing it. The reception at the right-hand end of the track section 6—9T of the inverse code causes the relay 9TP (see Fig. 3C) to follow the code, and by the pulsing of its contact 56 to cause the energization of relay 9H through the medium of the decoding transformer 9TF. The closure of front contact 57 of relay 9H causes the energization of relay 9HP. The relay 9D is also normally energized because of the 180 code received by the energization of a tuned circuit corresponding to that which has been described for the energization of the relay 6D. The energization of the relays 9H and 9D conditions the signal 9 to be clear, but the green lamp of such signal is dark because of the opening of its circuit at back contact 58 of relay 8HP.

It will be noted that the energization of the relay 9H at the right-hand end of track section 6—9T prevents the transmission of an inverse code in the track section 8—11T by the opening of the circuit for the relay 8CP at back contact 59. In a similar manner, the reception at the left-hand end of the track section 6—9T of the 180 driven code in causing the energization of the relay 6H (see Fig. 3B) prevents the relay 7CP from transmitting an inverse code from right to left in the track section 4—7T by the opening of back contact 60.

To consider the normal conditions of code transmission in the track section associated with a passing siding, Fig. 3A will be considered as being placed to the right of Fig. 3D. The relay 5CP is active for causing the transmission of a 75 driven code from right to left in the track section included between the ends of the passing siding because of its energization for each impulse of the oscillator 75C (see Fig. 3A) for the right-hand end of the passing siding by a circuit extending from (+), including contact 61 of oscillator 75C, back contact 62 of relay 4AG, back contact 63 of relay 5LDP, and winding of relay 5CP, to (—). The pulsing of contact 64 of relay 5CP causes the transmission of a 75 code from right to left in the track section by the energization of a track circuit corresponding to that which has been described for the track section 4—7T.

The reception of the 75 code at the left-hand end of the track section causes the relay 10TP (see Fig. 3D) to follow the code and effect the energization of the relay 10H by pulsing contact 65. The relay 10HP is normally energized because of the closure of its circuit at front contact 66 of relay 10H. The signal 10A must indicate stop under normal conditions because its office controlled relay 10RD is deenergized, and the deenergized condition of the relay 10RDP prevents the relay 10CP from being active for the transmission of an inverse code in the track section 10—13T because of the opening of front contact 67 in the circuit for such relay.

*Control of leaving signal for eastbound traffic.*—To consider the control of a leaving signal, a traffic condition will be assumed such as that illustrated in Fig. 2A in which an eastbound train is occupying the siding A. For considering the conditions relative to the passage of such train, Figs. 3A through 3D will be assumed as being placed end to end respectively.

With reference to Fig. 3A, the communication of a control from the control office for causing the signal 4B to indicate caution for the passage of the eastbound train into the stretch of single track between the passing sidings A and B causes the energization of the relay 3WZ with a polarity to cause such relay to operate its polar contact to its left-hand position. After such relay has been conditioned upon the reception of a control cycle from the control office, the relay 4RD is picked up during such cycle, and a stick circuit is closed for such relay extending from (+), including back contact 68 of relay 3R, front contact 69 of relay 4—5TP, front contact 70 of relay 4RD, winding of relay 4RD, and back contact 71 of relay 5LD, to (—). Included in multiple with front contact 69 of relay 4—5TP in that circuit is back contact 72 of relay 4—5TR. Such combination of contacts in multiple provides what will be readily recognized as a means for causing the release of the relay 4RD when the OS track section 4—5T becomes unoccupied in the rear of a train.

Upon the picking up of relay 4RD, a circuit is closed for the energization of the relay 4RDP, extending from (+), including front contact 73 of relay 4RD, back contact 74 of relay 4H, and winding of relay 4RDP, to (—). The picking up of such relay closes a stick circuit at front contact 76 to shunt back contact 74 of relay 4H out of the circuit just described. It will be noted that the relay 4RDP can be picked up only in the absence of the transmission of code from right to left in the track section 4—7T. It is this contact that prevents the removal of code transmitted from left to right in the track section 4—7T when signals governing the passage of a westbound train are dependent upon such code.

Under the assumed traffic conditions, however, the picking up of the relay 4RDP renders the relay 4CP inactive for the transmission of a driven code from left to right in the track section 4—7T by the opening of back contact 22 and the cessation of such code causes the dropping away of the relay 7H (see Fig. 3B) at the right-hand end of the track section. The dropping away of relay 7H opens the circuit for the relay 7HP at front contact 30, and the dropping away of relay 7HP closes a circuit by which the relay 7CP becomes active for the transmission of a 180 driven code from right to left in the track section 4—7T. Such circuit extends from (+), including contact 77 of relay 7TR in its right-hand position, contact 78 of oscillator 180C, front contact 79 of relay 6HP, back contact 80 of relay 7HP, back contact 81 of relay 7S, and winding of relay 7CP, to (—).

The reception at the left-hand end of the track section 4—7T of the 180 driven code causes the pulsing of contact 82 of relay 4TP (see Fig. 3A) to be effective for energizing the relays 4H and 4D. When relay 4H has been picked up, a circuit is closed for the energization of the signal control relay 4BG for the signal 4B extending from (+) including front contact 83 of relay 4—5TR, polar contact 84 of relay 3WZ in its left-hand position, front contact 85 of relay 4RDP, front contact 86 of relay 4H, and winding of relay 4BG, to (—). In accordance with the energization of the relay 4BG, the red lamp of signal 4B is extinguished upon the opening of back contact 87, and the yellow lamp of such signal is illuminated upon the closure of front contact 87.

At the right-hand end of the track section 4—7T, the dropping away of the relay 7HP (see Fig. 3B) upon the removal of the 75 driven code normally transmitted in the track section, causes the illumination of the green lamp for the intermediate signal 6 by the energization of an obvious circuit closed at back contact 48 of relay 7HP with the relays 6H and 6D picked up.

The dropping away of the relay 7HP is also effective to cause the removal of the inverse code normally transmitted from left to right in the intermediate track section 6—9T. The relay 6CP becomes inactive for the transmission of such code because of the opening of its circuit at front contact 51 of relay 7HP.

The removal of the inverse code from the track section 6—9T causes the dropping away of the relays 9H (see Fig. 3C) and 9D at the right-hand end of the track section, and the dropping away of relay 9H opens the circuit for relay 9HP at front contact 57. The dropping away of relay 9HP closes an obvious circuit for the yellow lamp of signal 8 at back contact 37. Upon the dropping away of the relay 9H, a circuit is closed at back contact 59 by which the relay 8CP becomes active for the transmission of an inverse code from left to right in the track section 8—11T. The relay 8CP is momentarily energized at the end of each driven code impulse for the transmission of an inverse code impulse because of the closure of a circuit extending from the left-hand terminal of the secondary winding 28 of transformer 8TF2 including back contact 89 of relay 9S, back contact 59 of relay 9H, front contact 90 of relay 8H, front contact 91 of relay 8HP, back contact 92 of relay 8S, and winding of relay 8CP, to (—). Thus, at the end of each driven code impulse, the relay 8CP is momentarily energized to apply an inverse code pulse. The rate of these inverse code pulses must therefore be at the same rate as the driven code causing them.

The reception at the right-hand end of the track section 8—11T of the inverse code causes the picking up of the relay 11H, and the picking up of such relay opens the circuit for the relay 11LDP at back contact 93 so that the communication of a control from the control office to cause the picking up of the relay 11LD for the clearing of a signal for westbound traffic could not interrupt the circuit for the relay 11CP at back contact 33.

When the eastbound train accepts the signal 4B and enters the OS track section 4—5T (see Fig. 3A), the dropping away of the relay 4—5TR opens the circuit which has been described for the relay 4BG at front contact 83, and the release of relay 4BG causes the extinguishing of the yellow lamp of signal 4B and the illumination of the red lamp upon the shifting of contact 87.

The dropping away of the relay 4—5TR shifts contact 94 and thereby causes an interruption in the circuit for a change relay located at the field station which acts to initiate a cycle of operation of the code type communication system for the transmission of an indication to the control office of the occupancy of such OS track section. The indication transmitted to the control office is selected in accordance with the closure of back contact 95 of relay 4—5TR.

The relay 4RD remains energized, however, while a train is passing through the OS track section because its stick circuit is maintained closed by the closure of the back contact 72 of relay 4—5TR prior to the opening of front contact 69 of the relatively slow-acting track repeater relay 4—5TP. When the OS track section becomes unoccupied in the rear of the train, however, the picking up of the relay 4—5TR prior to the picking up of the relay 4—5TP interrupts the stick circuit for the relay 4RD so as to cause such relay to be dropped away. The dropping away of the relay 4RD opens the circuit for the repeater relay 4RDP at front contact 73 to cause such relay to be dropped away.

The closure of back contact 22 of relay 4RDP in the circuit for relay 4CP renders such relay active for the transmission of a 75 code by the energization of a circuit which has been described when considering the normal conditions of the system, but the track section 4—7T is occupied by the eastbound train under such condition as illustrated in Fig. 2B, so the 75 driven code thus transmitted effectively follows the train through the track section.

*Control of entering signal for eastbound traffic.*—Under the traffic condition illustrated in Fig. 2B it is assumed that an operator has caused the transmission of a control to effect the picking up of the relay 10RDP with the polar contacts of the relay 4WZ operated to their left-hand position in correspondence with the normal position of the track switch 4W. Such control is for the clearing of the signal 10A for passage of an eastbound train on the main track. It is believed to be readily recognized that the relay 10RD (see Fig. 3D) is picked up, and maintained energized by a stick circuit in a manner corresponding to that which has been described in detail in connection with the energization of the relay 4RD.

Upon the picking up of the relay 10RD, a circuit is closed to cause the picking up of the relay 10RDP extending from (+), including front contact 96 of relay 10RD, back contact 97 of relay 10CS, front contact 98 of relay 10H, and winding of relay 10RDP, to (—). The picking up of that relay closes a stick circuit at front contact 99 to shunt contacts 97 and 98 out of the circuit just described.

The picking up of the relay 10RDP renders the relay 10CP active for the transmission of an inverse code from left to right in the track section 10—13T because of the energization at the end of each driven code impulse of a circuit extending from the left-hand terminal of secondary winding 100 of transformer 10TF2 including front contact 61 of relay 10RDP, polar contact 101 of relay 4WZ in its left-hand position, back contact 102 of relay 10CS, and winding of relay 10CP, to the right-hand terminal of secondary winding 100.

The reception at the right-hand end of the track section of the inverse code causes the picking up of the relay 5H (Fig. 3A placed to the right of Fig. 3D), and the picking up of such relay opens the circuit for the relay 5LDP at back contact 103 to prevent an interruption in the transmission of the driven code from right to left in the track section if an operator should cause the transmission of a code for the illumination of the take-siding signal 5B. If the operator should inadvertently cause the transmission of a control for the clearing of signal 5A, the relay 5LDP would not be picked up and thus the transmission of the driven code by the relay 5CP would not be interrupted.

In accordance with the picking up of the relay 10RDP (see Fig. 3D) and the reception of a 75 driven code at the left-hand end of the track section included within the ends of the passing siding, a circuit is closed to cause the picking up of the relay 10AG extending from (+), including front contact 104 of relay 10—11TR, polar contact 105 of relay 4WZ in its left-hand position, normally closed contact 106 of the switch circuit controller of the spring switch mechanism of track switch 4W, front contact 107 of relay 10RDP, front contact 108 of relay 10H, and winding of relay 10AG, to (—). The shifting of contact 109 of relay 10AG causes the extinguishing of the red lamp of signal 10A and the illumination of the yellow lamp of such signal in accordance with the closure of back contact 110 of relay 10D.

As was the case when considering the passage of an eastbound train past the leaving signal 4B, the signal 10A is restored to stop upon the dropping away of the OS track relay 10—11TR because of the opening of the circuit for relay 10AG at front contact 104, but the relays 10RD and 10RDP are maintained picked up until the OS track section 10—11T has become unoccupied in the rear of the train so as to cause a momentary interruption in the stick circuit for the relay 10RD dependent upon the picking up of the relay 10—11TR prior to the picking up of the repeater relay 10—11TP.

The picking up of the relay 10AG for the signal 10A changes the driven code transmitted from right to left in the track section 8—11T from a 75 to a 180 code upon the shifting of contact 32. At the left-hand end of the track section 8—11T, the change to a 180 code causes the picking up of the relay 8D (see Fig. 3C), and the shifting of contact 111 of relay 8D opens the circuit for the yellow lamp of signal 8 and closes the circuit for the green lamp of such signal.

*Progress of an eastbound train.*—To consider progress of an eastbound train through the stretch of single track between the passing sidings A and B, it will be assumed that such a train occupies the track section 4—7T as illustrated in Fig. 2B, the OS track section 4—5T having become unoccupied in the rear of the train. The progress of the train to this point has been described when considering the conditions affecting the control of the signal 4B.

When the eastbound train accepts the signal 6 and enters the track section 6—9T, the dropping away of relay 6H prior to the dropping away of the relatively slow-acting repeater relay 6HP closes a circuit by which the relay 6CP is momentarily picked up to provide energization for the series relay 6SR and thereby effect the picking up of the stick relay 6S. The relay 6CP is picked up under such conditions by the energization of a circuit extending from (+), including back contact 52 of relay 6H, front contact 53 of relay 6HP, back contact 54 of relay 6S, and winding of relay 6CP, to (—). The closure of front contact 55 of relay 6CP with the track section 6—9T shunted by a train causes the picking up of the series relay 6SR by the energization of an obvious circuit, and the picking up of such relay closes a circuit by which the relay 6S can be picked up. It is to be understood that the characteristics of each of the series relays is such that it is picked up only upon the increased flow of current in its respective track circuit when such track circuit is shunted by a train. The circuit for relay 6S extends from (+), including back contact 44 of relay 6H, front contact 112 of relay 6HP, back contact 113 of relay 7HP, front contact 114 of relay 6SR, and winding of relay 6S, to (—). The opening of back contact 54 of relay 6S in the circuit for relay 6CP terminates the impulse, and the relay 6S is maintained picked up by an obvious stick circuit closed at back contact 44 of relay 6H. The relay 7CP becomes active for the transmission of a 75 driven code from right to left in the track section 4—7T upon the picking up of relay 6S because of the energization for each impulse of the oscillator 75C at such intermediate location of a circuit extending from (+), including contact 77 of relay 7TR, in its right-hand position, contact 115 of oscillator 75C, front contact 116 of relay 6S, back contact 79 of relay 6HP, back contact 80 of relay 7HP, back contact 81 of relay 7S, and winding of relay 7CP, to (—). It will be noted that such circuit includes back contact 80 of relay 7HP, and therefore when there is a code fight in the track section 4—7T when such track section becomes unoccupied in the rear of the eastbound train, the relay 7CP is rendered inactive as soon as the code transmitted from the left-hand end of the track section is effective to cause the picking up of the relay 7HP.

This happens because the two code transmitter relays 4CP and 7CP at opposite ends of the track section 4—7T obviously will not stay in exact synchronism for any substantial period of time, due to the fact that the two different code oscillators producing the respective 75 codes are not identical in their operation because of variations in manufacture. If desired, these two oscillators may be arbitrarily set to be slightly different such as for a 74 code and a 76 code respectively so as to produce the non-synchronized condition more quickly, it being understood that such slight variations from the exact 75 code rate is not sufficient to have any adverse effect on the decoding apparatus receiving the driven codes which they produce. With the code transmitters 4CP and 7CP operating slightly out of synchronism and gradually hunting to such a relation in their operation that they may be directly opposite from each other, sufficient energy is transmitted to operate the track relay 7TR which in turn is repeated by the relay 7TP a sufficient number of times to pick up the relay 7H which in turn will be repeated by the relay 7HP. The picking up of the relay 7HP will open the control circuit for the relay 7CP at back contact 80 so that there is then no code opposing the transmission of the 75 driven code by the relay 4CP. It is noted that the control circuit for the relay 4CP does not include a back contact of a relay H or HP so that such code transmitter is superior to the code transmitter 7CP at the opposite end of the track circuit. In this way, a code fight in the rear of a train having just passed through the end track section 4—7T in an eastbound direction is settled in the favor of the normal prevailing code transmission.

The conditions of code transmission in the end section 4—7T are therefore restored to normal in the rear of an eastbound train, and by such restoration conditions are established whereby a route can be established for a following train if a signal control is transmitted from the control office for allowing signal 4A or signal 4B to indicate proceed. From the description as it has been set forth, the condition which allows the removal of the 75 code transmitted from right to left in the track section 4—7T is dependent upon the closure of back contact 74 of relay 4H (see Fig. 3A) in the pick-up circuit for the relay 4RDP. The relay 4RDP can be picked up therefore in accordance with the establishment of a route for a following train as illustrated in Fig. 2N at a time when the relay 4H is deenergized, either because of the presence of an eastbound train in the track section 4—7T, or in accordance with the conditions illustrated in Fig. 2C where the eastbound train has advanced to a position to allow the track section 4—7T to become unoccupied in the rear of the train. In accordance with the picking up of the relay 4RDP, the relay 4CP is rendered inactive for the transmission of the code from left to right in the track section 4—7T by the opening of back contact 22, and the cessation of the transmission of code from left to right in the track section 4—7T establishes conditions which have been described whereby the code transmitter for the right-hand end of the track section is rendered active. With reference to Fig. 3B, the relay 7CP would become active under the conditions illustrated in Fig. 2N in accordance with the energized condition of relay 6S for the transmission of a 75 driven code to provide for the caution indication of signal 4A. The relay 7CP would be active for the transmission of such code by the energization of a circuit extending from (+), including contact 77 of relay 7TR in its right-hand position, contact 115 of oscillator 75C, front contact 116 of relay 6S, back contact 79 of relay 6HP, back contact 80 of relay 7HP, back contact 81 of relay 7S, and winding of relay 7CP, to (—).

It will be noted with reference to Fig. 2C that there is no driven code following the train in track section 6—9T, as the normal conditions of code transmission in that intermediate section is from right to left. When the train accepts the clear signal 8 and enters the track section 8—11T, the stick relay 8S (see Fig. 3C) is picked up through the medium of the relays 8CP and 8SR in a manner corresponding to that which has been described in detail for the energization of the relay 6S associated with the signal 6. The dropping away of relay 8HP opens a circuit at front contact 41 by which the relay 9CP has been active for the transmission of a 180 driven code, and the closure of back contact 41 of relay 8HP with the relay 8S energized closes a circuit by which the relay 9CP becomes active for the transmission of a 75 driven code, such circuit corresponding to the circuit previously described for the transmission of a 75 driven code under similar conditions by the relay 7CP.

The reception at the left-hand end of the track section 6—9T of the 75 driven code when such track section becomes unoccupied in the rear of the eastbound train, causes the picking up of the relays 6H and 6HP (see Fig. 3B), and the opening of back contact 44 of the relay 6H causes the release of the stick relay 6S. Such conditioning of the relays 6H, 6HP and 6S restores a circuit for the relay 6CP which has been described when considering the normal conditions of the system by which such relay transmits an inverse code from left to right in the track section 6—9T as illustrated in Fig. 2D.

Under the traffic conditions illustrated in Fig. 2C, it is assumed that an operator at the control office causes the transmission of a control for the clearing of the leaving signal 12A at the right-hand end of the passing siding B. This signal will be readily recognized as corresponding to signal 4A of Fig. 3A which has its control circuits shown in detail. The mode of operation of the system with respect to the clearing of such signal and the restoration of such signal to stop in the rear of a train corresponds to that which has been described in detail for the signal 4B, except that a control is communicated from the control office for the relay WZ corresponding to the relay 3WZ for the actuation of its polar contacts to their normal right-hand positions so as to select the clearing of the leaving signal for the main track rather than the leaving signal for the siding. The picking up of the AG relay for governing such signal shifts the driven code transmitted in the track section included between the ends of the passing siding from a 75 code to a 180 code in a manner corresponding to that illustrated in Fig. 3A in which the picking up of the relay 4AG shifts the code transmitted by the relay 5CP at contact 62. The reception at the left-hand end of the track section of the 180 code causes the picking up of the relay 10D (see Fig. 3D), and the picking up of such relay causes the extinguishing of the yellow lamp and the illumination of the green lamp of signal 10A upon the shifting of contact 110.

When the end track section 8—11T becomes unoccupied in the rear of the eastbound train, the relay 11CP is active for the transmission of a 75 driven code by the energization of a circuit which has been described when considering the normal conditions of the system. The reception at the left-hand end of the track section 8—11T of the 75 code causes the picking up of the relays 8H and 8HP (see Fig. 3C), and the picking up of relay 8H causes the dropping away of the stick relay 8S, thus completing the restoration to normal conditions of the portion of the system associated with the stretch of single track extending between the passing sidings A and B.

With reference to Fig. 2E, it will be noted that there is no driven code following the eastbound train in the track section 10—13T because the normal direction of driven code transmission in such track is from right to left, and under the traffic conditions illustrated in Fig. 2F where the track section 10—13T has become unoccupied in the rear of the train, the normal conditions are restored in which a 75 driven code is transmitted from right to left in such track section. The transmission of such code is effected by the energization of a circuit corresponding to the circuit which has been described when considering the normal conditions of the system for the relay 5CP.

*Westbound traffic.*—It will be noted upon comparing Figs. 2G through 2M with Figs. 2A through 2F respectively that a very similar mode of operation of the system is effective for westbound traffic as has been specifically described for eastbound traffic. Rather than describing specifically all of the conditions of the system upon the passage of a westbound train, specific reference will be made more particularly to conditions which do not correspond with the mode of operation which has been described for the passage of eastbound trains.

With reference to Fig. 2G, it is assumed that an operator causes the communication from the control office of a control for causing the caution indication of signal 11B for passage of the westbound train off of the passing siding B. The reception of such control causes the picking up of the relays 11LD and 11LDP (see Fig. 3D), and the picking up of relay 11LDP causes a reversal in the direction of driven code transmission in the end section 8—11T in a manner corresponding to that which has been described in connection with the reversal of the direction of code transmission in the track section 3—7T under the conditions illustrated in Fig. 2A.

A different condition exists for the intermediate track section 6—9T, however, in that a reversal in the direction of driven code transmission in such track section is necessary for westbound traffic. Thus, the cessation of the driven code normally transmitted from right to left in the track section 8—11T renders the relay 9CP (see Fig. 3C) ineffective for the transmission of a driven code from right to left in the track section 6—9T by the opening of the circuit by which such relay is normally active at front contact 41 of relay 8HP with the relay 8S deenergized.

The dropping away of relays 6H and 6HP (see Fig. 3B) at the left-hand end of the track section 6—9T conditions the relay 6CP to be active for the transmission of a 180 driven code. The relay 6CP is energized for each impulse of the oscillator 180C at that signal location by a circuit extending from (+), including polar contact 49 of relay 6TR in its left-hand position, contact 117 of oscillator 180C, front contact 118 of relay 7HP, back contact 53 of relay 6HP, back contact 54 of relay 6S, and winding of relay 6CP, to (—). The reception at the right-hand end of the track section 6—9T of the 180 code causes the relays 9H, 9HP and 9D (see Fig. 3C) to be picked up, and thus causes the illumination of the green lamp of signal 9 in accordance with the closure of the signal control circuit at back contact 58 of relay 8HP.

It will be noted that the removal of the code normally transmitted from right to left in the track section 6—9T causes the relay 7CP (see Fig. 3B) to become active for the transmission of an inverse code in the track section 4—7T in a manner similar to that described with reference to Fig. 2A where the removal of the inverse code normally transmitted through the track section 6—9T causes the transmission of an inverse code in the end section 8—11T to prevent the removal of a driven code employed in the established route.

When the detector track section 10—11T becomes unoccupied in the rear of the westbound train, the relay 11LDP is dropped away as illustrated in Fig. 2H, and a 75 driven code is transmitted in the rear of the train preparatory to restoration to normal conditions for that track section. When such track section becomes unoccupied in the rear of the train, as illustrated in Fig. 2J, a code fight is settled in favor of the driven code normally transmitted from right to left in the track section 8—11T, and the normal conditions of code transmission in such track section are thus restored. In a similar manner, the code transmitter relay 9CP becomes active upon the picking up of the relays 8H and 8HP as a step toward restoration to normal conditions for the intermediate track section, and a code fight is settled when the track section becomes unoccupied in the rear of the train in favor of the transmission of the 180 driven code from right to left in the track section 6—9T, the picking up of the relay 6HP being effective to render the code transmitter relay 6CP inactive.

The condition with respect to the transmission of codes through the track section associated with a passing siding is somewhat different from that which has been described for eastbound traffic in that reversal in the direction of code transmission in such track section is also necessary. Such reversal becomes effective upon the energization of the relay 5LDP as illustrated in Fig. 2H. The picking up of relay 5LDP responsive to the communication of a control from the control office for the clearing of signal 5A causes the relay 5CP to become inactive for the transmission of a code from right to left in the track section 2—5T by the opening of back contact 63 of relay 5LDP if the signal 5A has been selected to be cleared by the energization of the relay 3WZ so as to operate its polar contact to a right-hand position. The inclusion of contact 119 of relay 3WZ in multiple with back contact 63 of relay 5LDP in the circuit for relay 5CP is to provide that the transmission of code from right to left in the track section 2—5T will not be disturbed when a take-siding indication is to be displayed by signal 5B for the passage of a train into the passing siding A.

To consider the effect of the removal of the driven code from the track section 2—5T, Fig. 3D will be considered as being placed to the left of Fig. 3A in that the control apparatus of such figure corresponds to that which would be provided at the left-hand end of the passing siding A. Considering the drawings in this relationship, the removal of the code normally transmitted from right to left in the track section included between the ends of the passing siding causes the dropping away of the relays 10H and 10HP, and a circuit is closed upon the dropping away of the relay 10H for the picking up of the relay 10CS. Such circuit extends from (+), including back contact 66 of relay 10H, front contact 120 of relay 10HP, front contact 121 of relay 10—11TP, and winding of relay 10CS, to (—). The picking up of such relay closes an obvious stick circuit at back contact 122 of relay 10TR in its left-hand position to shunt contacts 66, 120 and 121 out of the circuit just described.

In accordance with the picking up of the relay 10CS, the relay 10CP becomes active for the transmission of a 75 code if the relay 11AG for the signal 11A is dropped away. Such circuit extends from (+), including contact 123 of relay 10TR in its left-hand position, contact 124 of oscillator 75C, back contact 125 of relay 11AG, front contact 102 of relay 10CS, and winding of relay 10CP, to (—).

The reception at the right-hand end of the track section of the 180 driven code causes the picking up of the relays 5H and 5D. The energization of the relay 5H under such conditions closes a circuit for the relay 5AG extending from (+), including front contact 83 of relay 4—5TR, contact 84 of relay 3WZ in its right-hand position, normally closed contact 126 of the switch circuit controller of the spring switch mechanism for track switch 3W, front contact 127 of relay 5LDP, front contact 128 of relay 5H, and winding of relay 5AG, to (—). The closure of front contact 129 of relay 5AG with the relay 5D dropped away causes the energization of the yellow lamp of signal 5A in an obvious manner.

It will be noted with reference to the circuit which has been described for relay 10CP, that such relay is effective to transmit whenever the code sending relay 10CS is picked up, and it will be noted that the relay 10CS is maintained picked up until a code is received at the left-hand end of the track section to open its circuit at contact 122 of relay 10TR in its left-hand position. By this arrangement it is provided that an attempt of the operator to clear a signal for eastbound traffic at the left-hand end of the passing siding is ineffective for changing the condition of code transmission in the track section included between the ends of the passing siding.

In Figs. 2J and 2K, it has been assumed that an operator has caused the transmission of a control for the clearing of the leaving signal 3A, and thus has caused a change in the code transmitted through the track section 2—5T for the control of signal 5A from a 75 to a 180 code.

When the westbound train enters track section 6—9T as illustrated in Fig. 2J, the stick relay 9S is picked up in accordance with the momentary energization of the relay 9CP to provide an impulse in the track section 6—9T for the energization of the series relay 9SR, the energization of such series relay being required for the picking up of the relay 9S. The relay 9CP is picked up to provide that impulse in accordance with the energization of a circuit extending from (+), including back contact 132 of relay 9H, front contact 133 of relay 9HP, back contact 134 of relay 8S, back contact 41 of relay 8HP, and winding of relay 9CP, to (—).

With reference to Fig. 2K, although the 180 driven code normally transmitted from right to left in the track section 6—9T has been restored, the inverse code for such track section cannot be restored until a code is received at the right-hand end of the end section 4—7T. The absence of such inverse code, however, does not cause the transmission of an inverse code from left to right in the end section 8—11T as such inverse code can be transmitted only when the stick relay 9S is dropped away to close back contact 89 in the circuit for the relay 8CP. The relay 9S is maintained picked up by back contact 57 of relay 9H in the usual manner, and thus the transmission of an inverse code in the track section 8—11T is prevented.

When the end section 4—7T becomes unoccupied in the rear of the westbound train, the restoration to the normal condition of track circuit code communication in the track section 4—7T is effective for causing the restoration of the inverse code in the track section 6—9T, and reception at the right-hand end of the track section 6—9T of such inverse code causes the picking up of relays 9H and 9HP. The opening of back contact 57 of relay 9H causes the release of the stick relay 9S, but the picking up of the relay 9H also opens the circuit by which the relay 8CP would have to be active for the transmission of an inverse code at back contact 59.

With reference to Fig. 2L, the dropping away of the relay 5LDP when the OS track section 4—5T becomes unoccupied in the rear of the westbound train is effective to restore the normal conditions of code transmission for the relay 5CP, and when the track section 2—5T becomes unoccupied in the rear of the train, the energization of relay 10TR is effective to cause the release of relay 10CS by opening its circuit at contact 122 in its left-hand position. The dropping away of the relay 10CS opens the circuit which has been described by which the relay 10CP has been active for the transmission of a driven code at front contact 102. The relay 10CP is inactive for the transmission of an inverse code because the circuit for such relay is open at front contact 67 of relay 10RDP, thus the normal conditions of code transmission have been restored for the track circuit control apparatus associated with the track section included between the ends of the passing siding.

*Take-siding signal.*—As a matter of economy in this embodiment of the present invention, the track switches at the ends of passing sidings are hand operated rather than power operated, and in accordance therewith, take-siding signals such as the signal 5B, for example, are controlled by an operator at the control office so as to provide an indication for an approaching train as to whether or not such train is to enter the passing siding associated therewith. Each of such signals is normally dark, and the letter S on such signal is illuminated by a red lamp when a control has been communicated from the control office for causing a train approaching such signal to enter the passing siding. It will therefore be apparent that a take-siding signal indicates that the track switch belonging to that field station is to be operated to its reverse position rather than such signal indicating an established route.

With reference to Fig. 3A, the reception of a control cycle at the field station No. 3 associated with the right-hand end of the passing siding A for the passage of a west-bound train into the passing siding, causes the picking up of the relay 5LD, and the actuation of the polar contacts of relay 3WZ to their left-hand position. In accordance with the conditioning of those relays, the picking up of the repeater relay 5LDP establishes a circuit for the energization of the signal control relay 5BG. Such circuit extends from (+), including front contact 83 of relay 4—5TR, polar contact 84 of relay 3WZ in its left-hand position, front contact 130 of relay 5LDP, and winding of relay 5BG, to (—). The picking up of relay 5BG causes the energization of the red lamp of signal 5B upon the closure of front contact 131.

Although the track switches in this embodiment of the present invention are hand operated spring switches, it is to be understood that spring switches are employed only as a matter of facilitating the elimination of train stops, and it is to be further understood that each of the track switches can be power operated as disclosed, for example, in the above mentioned Judge et al. patent, and as also disclosed in my prior application, Ser. No. 439,520, filed April 18, 1942. If the track switches are power operated as disclosed in that application, the power operation of each of the track switches and the control of each of the take-siding signals, can be provided as shown in Fig. 8 of that disclosure, the neutral relays WN and WR being substituted in the control of the track switch for the polar WZ relay employed in this embodiment of the present invention.

*Back-up moves.*—It is believed to be readily apparent to those familiar with the art from the description as it has been set forth how the system is adapted to the proper control of signals for back-up moves.

With reference to Fig. 2B, it will be noted that the operator can cause the clearing of signal 5A, for example, for a back-up move of the eastbound train in a manner which has been described when considering the passage of a westbound train; reversal in the direction of driven code transmission in the track section 2—5T being effected upon the picking up of the relay 5LDP. If the eastbound train is to be backed into the passing siding A, a control is communicated from the control office for the picking up of the relay 5LD (see Fig. 3A) with the polar contacts of relay 3WZ operated to their left-hand position, and in accordance with the reception of such control at the field station No. 3, the relay 5BG is picked up for the illumination of the red lamp of the take-siding signal 5B. It will be noted that the driven code normally transmitted from right to left in the track section 2—5T is not interrupted by the control received for the take-siding signal 5B because of the inclusion of polar contact of relay 3WZ in its left-hand position in multiple with back contact of relay 5LDP in the circuit for the code transmitter relay 5CP.

It is further provided that signals can be employed to govern a back-up move even where intermediate signals are involved. Thus, with reference to Fig. 2C, the intermediate signal 7 is at caution in the rear of the eastbound train, thus providing an indication that can be employed for a back-up move. This is a safe condition in that the establishment of a route for a following eastbound train would cause the removal of the 75 driven code normally transmitted from left to right in the end track section 4—7T, and thus cause the intermediate signal 7 to be put to stop to prevent an unsafe movement of the trains. It is believed to be readily apparent that the signal 7 would indicate clear for a back-up move if the operator at the control office were to cause the clearing of the signal in advance, and thereby cause the code transmitted from left to right in the track section 4—7T to become a 180 code.

*Modifications.*—In accordance with the principles of the mode of operation as they have been set forth in the description of a specific embodiment of the present invention, it is believed to be readily apparent to those familiar with the art how the system can be readily adapted to varying requirements in practice with respect to the location of signals, and to the number of track sections to be included in various stretches of single track included between passing sidings.

For example, it is believed to be readily apparent how additional intermediate track sections can be added in a stretch of single track extending between passing sidings in accordance with the teachings of this embodiment of the present invention. The circuits for such additional track sections would correspond to those which have been illustrated in detail with respect to the communication of signal controls by track circuit code through the track section 6—9T.

It is also to be understood that the intermediate track section 6—9T could readily be eliminated if the stretch of track between the passing sidings A and B were short enough to allow such elimination without materially affecting the circuits or the mode of operation of the apparatus associated with the end sections 4—7T and 8—11T. In connection with adaptations for a shorter stretch of track extending between the passing sidings A and B, it might be desirable in practice to employ staggered intermediate signals rather than two double signal locations. It is believed to be readily apparent to those skilled in the art how the circuits of this embodiment of the present invention can be adapted to such signal arrangement in accordance with the usual practice in the control of staggered intermediate signals.

In that the system provided by the present invention is adapted to providing for back-up moves, even where intermediate signals are involved, it is believed to be apparent that the system is readily adaptable to conditions involving outlying switches as disclosed in detail in my prior application Ser. No. 439,520, filed April 18, 1942. Where outlying switches are involved, the operation of an outlying switch to its normal position after a train has entered such switch, allows the restoration of the track circuit code communication means for the stretch of track involved to its normal condition, and thus allows an operator to establish a route along the main stretch of track for the passage of the train in either direction from the outlying switch.

Having described a signal control system as applied to a particular portion of trackway as one embodiment of the present invention, it is desired to be understood that this form is selected to facilitate in the disclosure of the invention rather than to limit the number of forms which the invention may assume, and it is to be further understood that various adaptations, alterations and modifications may be applied to the specific form shown to meet the requirements of practice without in any manner departing from the spirit or scope of the present invention except as limited by the appending claims.

What I claim is:

1. In a centralized traffic control system of the coded track circuit type, a stretch of single track extending between two passing sidings and divided into track sections so as to have end-sections adjacent the respective sidings, head-block signals at each siding for governing traffic into the stretch from that end, code transmitting means associated with each head-block signal for normally transmitting driven code pulses over the adjacent end-section toward the remote end of that section, means associated with the remote end of each end-section responsive to the cessation of driven code from the head-block signal associated with its section for transmitting a reverse driven code over its section toward said head-block signal, said means being dependent upon the transmission of a driven code from the head-block signal associated with the other end-section, and signal control means associated with each head-block signal and responsive to manual control for acting on said code transmitting means at such head-block signal to cause the cessation of said normal driven code, said means being responsive to the reception of said driven code while under manual control for clearing its head-block signal, whereby the direction of driven code need be reversed in only one of the end-sections in response to manual control for clearing either head-block signal.

2. In a centralized traffic control system of the coded track circuit type, a stretch of single track divided into track sections and having an end-section adjacent a siding, a head-block signal at said siding for governing traffic into said end-section, an intermediate signal at the remote end of said end-section for governing traffic toward said head-block signal, code transmitting means associated with said head-block signal for normally transmitting a driven code over said end-section to govern the indication of said intermediate signal, means associated with said intermediate signal responsive to the cessation of driven code from said head-block signal for transmitting a reverse driven code over said end-section to govern the indication of said head-block signal, manually governed signal control means associated with said head-block signal and acting in response to manual control from a remote control office for causing the cessation of said normal driven code, said means also acting in response to said manual control to clear said head-block signal while a reverse driven code is being received, means at said intermediate signal location and manually governed from the remote control office for at times applying inverse code pulses to said end section during the off periods of said normal driven code then being received at said intermediate signal location, and means at said head-block signal responsive to the reception of inverse code pulses for preventing the manual control of said signal control means, to thereby prevent the cessation interruption of said normal driven code.

3. In a centralized traffic control system of the coded track circuit type, a stretch of single track divided into track sections and having an end-section adjacent a siding, a head-block signal at said siding for governing traffic into said end-section, an intermediate signal at the remote end of said end-section for governing traffic toward said head-block signal, code transmitting means associated with said head-block signal for normally transmitting a driven code over said end-section to govern the indications of said intermediate signal, means associated with said intermediate signal responsive to the cessation of driven code from said head-block signal for transmitting a reverse driven code over said end-section to govern the indication of said head-block signal, remote control means associated with said head-block signal acting in response to manual control from a remote point for causing the cessation of said normal driven code to thereby permit a reverse driven code to be transmitted from said intermediate signal, signal control means at said head-block signal responsive to the reception of a reverse driven code, while said remote control means is preventing the transmission of said normal driven code, to effect the clearing of said head-block signal, means at said intermediate signal location and manually governed from said remote point and also governed by the approach of a train for causing an inverse code to be applied to said end-section providing said normal driven code is being transmitted, and means at said head-block signal responsive to the reception of an inverse code for preventing said remote control means from causing the cessation of said normal driven code, whereby said intermediate signal cannot be manually caused to indicate stop while a train is approaching that signal.

4. In a centralized traffic controlling system of the coded track circuit type, a stretch of single track extending between two passing sidings and divided into at least two track sections so as to have end-sections adjacent the respective sidings, a head-block signal at each siding for governing traffic into the stretch from that end, code transmitting means associated with each head-block signal for normally transmitting driven code pulses over the adjacent end-section toward the remote end of that section, means associated with the remote end of each end-section responsive to the cessation of driven code from the head-block signal associated with its section for transmitting reverse driven codes in its section toward said head-block signal having a rate dependent upon the rate of the normal driven code transmitted from the head-block signal associated with the other end-section, manually controllable signal control means associated with each head-block signal and effective in response to manual control for causing the cessation of the normal driven code transmitted by its associated code transmitting means, means responsive to the interruption of the normal driven code in either end-section for preventing the interruption of driven code at the other end-section by its associated signal control means, and means associated with each head-block signal and controlled jointly by said manually operable control means and the reception of a reverse driven code for clearing its head-block signal.

5. In a centralized traffic controlling system of the coded track circuit type, a stretch of single track extending between two passing sidings and divided into track sections so as to have end-sections adjacent the respective sidings, head-block signals at each siding for governing traffic into the stretch from that end, code transmitting means associated with each head-block signal for transmitting a normal driven code over the adjacent end-section toward the remote end of that section, means associated with the remote end of each end-section responsive to the cessation of said normal driven code from the head-block signal associated with its section for transmitting a reverse driven code over its section toward its head-block signal in accordance with the normal driven code of the other end-section, said means at the same time acting to cause an inverse code to be transmitted in said other end-section towards its head-block signal, signal control means manually operable to act on said code transmitting means associated with each head-block signal to cause the cessation of the transmission of said normal driven code from that head-block signal whereby a reverse driven code is transmitted over the associated end section and an inverse code is transmitted toward the other head-block signal over its associated end-section, means at each head-block signal responsive to the reception of an inverse code for preventing manual actuation of the associated signal control means, and means associated with each head-block signal jointly controlled by said manual signal control means and by the reception of a reverse driven code for clearing said head-block signal.

6. In a coded track circuit centralized traffic controlling system for single track railroads, a stretch of track adjacent a passing siding with signals at opposite ends for governing the entrance of traffic into the stretch, code transmitting means associated with one of said signals at one end of said stretch for normally transmitting a driven code over the rails of said stretch toward the other signal, means at said other signal responsive to the cessation of said normal driven code for applying a reverse driven code, signal control means for each of said signals responsive to manual control for clearing its respective signal when a driven code is received at its location, said signal control means for said one signal acting to cause the cessation of said normal driven code, and said means for said opposite signal effective when rendered active to transmit an inverse code over said stretch of track toward said one signal, and means associated with said one signal and responsive to the reception of an inverse code for preventing said signal control means at that signal from causing the cessation of said normal driven code.

7. In a coded track circuit centralized traffic controlling system for single track railroads, a stretch of track between passing sidings with a signal at each end governing the entrance of traffic into the stretch, code transmitting means at each end of the stretch for normally transmitting driven code pulses toward the opposite end when its associated signal is at stop, a manually operable signal lever for each of said signals in a remote control office, a code type communication system for transmitting control codes over line wires extending from said remote office to the signal location at one end or the other of said stretch in accordance with the operated position of the corresponding one of said signal levers, signal clearing means associated with each signal and responsive to the reception of a control code at that signal over said line wires of said communication system for stopping the operation of the code transmitting means associated therewith and for governing the clearing of the corresponding signal, whereby the transmission of a signal control code to a single signal location effects the clearing of that signal.

8. In a signaling system for railroads employing coded track circuits, a stretch of track between two passing sidings with a signal at each end of said stretch for governing the entrance of traffic into the stretch in opposite directions, code transmitting means at each end of the stretch for normally transmitting a driven code toward the opposite end when its associated signal is at stop, a manually operable signal lever in a remote control office for each of said signals, a code type communication system operable through cycles of operation for transmitting signal control codes over line wires extending from said remote office to said signal locations at the opposite ends of said stretch, said communication system being operable to transmit a signal control code to only one of the signal locations during any particular operating cycle, signal clearing means associated with each signal and responsive to the reception of a signal control code over said line wires of said communication system for stopping the operation of the driven code transmitting means at that signal location and at the same time governing the clearing of the corresponding signal, whereby the transmission of a signal control code on one operating cycle of the code type communication system is sufficient to control the direction of track circuit coding and clear the corresponding signal, and means responsive to the cessation of the driven code for either selected direction in response to the operation of the signal clearing means for the corresponding signal to prevent the response of the signal clearing means for the signal at the opposite end of the stretch to a signal control code over said code type communication system.

9. In a coded track circuit centralized traffic controlling system for single track railroads, a stretch of track between passing sidings with a head-block signal at each end for governing the entrance of traffic into the stretch in opposite directions, coded track circuit apparatus for the stretch including code transmitting means associated with each head-block signal for normally transmitting a driven code over the rails of said stretch toward the opposite head-block signal when its associated signal is at stop, a code type communication system operable through cycles of operation for transmitting different signal control codes, said system being capable of transmitting a signal control code to only one head-block signal location during any particular cycle of operation, remote control means at each head-block signal location acting in response to the reception of a signal clearing control over said communication system to cause the cessation of driven code originating at that signal location and establishing a direction of driven code toward that head-block signal in accordance with the driven code transmitted from the opposing head-block signal for clearing its associated head-block signal, and means controlled by either of said remote control means, when it is rendered active to clear its associated head-block signal, to act through the medium of the coded track circuit apparatus to prevent the clearing of the opposing head-block signal, whereby the transmission of a signal control code on a single cycle of operation of said communication system is sufficient to effect the clearing of the corresponding head-block signal and prevent the clearing of the opposing head-block signal.

10. In a centralized traffic controlling system of the coded track circuit type for a stretch of single track extending between passing sidings remote from a control office, such stretch of track being divided into track sections so as to have end-sections adjacent the respective sidings, a head-block signal at each siding for governing the entrance of traffic into said stretch of track, signal control relays for the respective head-block signals, a code type communication system connecting the control office with each of said head-block signals for selectively energizing the signal control relays for one head-block signal or the other in accordance with manual control at the control office for selecting the direction of traffic for said stretch of single track, coded track circuit apparatus for each track section of said stretch, said apparatus for each end-section acting to normally transmit a driven code away from its associated head-block signal providing the signal control relay for that head-block signal is deenergized, but effective to transmit a driven code in the opposite direction through such end-section upon cessation of said normal driven code, and signal control means for each of said head-block signals effective to cause such signal to indicate proceed only provided its associated signal control relay is energized and driven codes are transmitted toward such signal over the track sections between it and the opposing head-block signal, whereby the signal control relay associated with a head-block signal can alone determine the direction of coding for clearing its own signal.

11. In a centralized traffic controlling system of the coded track circuit type, a stretch of track remote from a control office including an insulated track section, coding control means for a particular end of said track section, a code type communication system connecting the control office with said particular end of said track section and being operable through different cycles of operation for transmitting distinctive controls from the office to distinctively condition said coding control means when an operator designates the corresponding end of said track section as the entrance end for a route including that track section, coded track circuit apparatus associated with said track section for normally transmitting a driven code over the rails thereof in a direction away from said particular end, said apparatus acting in response to the distinctive condition of said coding control means to cause a reversal in the direction of said driven code in said track section, means at the other end of said track section for transmitting an inverse code over the rails of said section during the off intervals of the driven code when that end is to be the entrance end of a route, and means associated with said particular end of said track section for preventing a reversal in the direction of said driven code when said inverse code is received.

12. In a coded track circuit signaling system for a stretch of single track divided into a plurality of track sections, a signal at each end of the track section for governing train movement into the stretch, code transmitting and code receiving means for the respective track sections normally cooperating to provide driven code pulses in one direction or the other in each track section, said code transmitting means for each end of each track section except the extreme ends of the stretch being governed by the code receiving means for the adjacent end of the adjoining track section, signal control means associated with the ends of said stretch and manually controlled from a distant control office for conditioning the signal at either selected end of the stretch to clear in response to the reception of driven code pulses and also for governing the direction of transmission of driven code pulses in said track sections, and means for each end of the stretch governed over the track rails of the stretch for rendering said signal control means ineffective to change the direction of transmission of driven code pulses existing in said track sections while the signal at the opposite end of the stretch is clear and also while said stretch is occupied by a train.

13. In a coded track circuit signaling system for a stretch of single track divided into a plurality of track sections, a signal at each end of the stretch governing train movement into said stretch, code transmitting means and code receiving means for the respective track sections normally cooperating to provide driven code pulses in a predetermined prevailing direction in each track section and operable in response to the cessation of said normal driven code pulses in a track section to cause transmission of driven code pulses in the opposite direction in that track section, said code transmitting means for each end of each track section except the extreme ends of the stretch being governed by the code receiving means for the adjacent end of the adjoining track section, signal control means at each end of the stretch selectively controlled manually from a distant control office for conditioning the associated signal to clear and also for stopping transmission of driven code pulses in a direction away from that signal, and means for each end of the stretch governed over the track rails of the stretch for rendering the associated signal control means ineffective to stop transmission of driven code pulses in the existing direction when the signal at the opposite end of the stretch is clear or the stretch is occupied.

14. In a coded track circuit signaling system for a stretch of single track between the ends of passing sidings divided into a plurality of track sections, a head-block signal at each end of said stretch governing train movement into the stretch, code transmitting and code receiving means for each end of said track section normally cooperating to provide driven code pulses in a predetermined prevailing direction in each track section, each of said code transmitting means except those for the ends of the stretch being controlled by the code receiving means for the adjacent end of the adjoining track section, each of said code transmitting means for those ends of track sections normally receiving driven code pulses being also governed by the associated code receiving means to provide reverse driven code pulses upon cessation of the driven code pulses in the normal prevailing direction, and signal control means for each head-block signal selectively controlled manually from a distant control office for conditioning the associated signal to clear in response to the reception of driven code pulses, and also for stopping transmission of the driven code pulses in those track sections where the direction of such coding is away from that signal, thereby establishing driven code pulses in each track section toward said signal.

15. In a coded track circuit signaling system for a stretch of single track between the ends of passing sidings and divided into a plurality of track sections, a head-block signal at each end of the stretch for governing train movement into said stretch, code transmitting and receiving means for the respective track sections normally cooperating to provide driven code pulses in a predetermined prevailing direction over the track rails of each track section and acting in response to the cessation of driven code pulses in the prevailing direction in that track section to provide reverse driven code pulses in the opposite direction, said code transmitting means for each end of each track section except the extreme ends of the stretch being governed by the code receiving means for the corresponding end of the next adjoining track section, and signal control means for each of the stretch selectively governed from a distant control office for conditioning the head-block signal at the corresponding end of the stretch to clear in response to the reception of driven code pulses, each of said signal control means acting when effective to stop transmission of driven code pulses in the normal prevailing direction in those track sections where the direction of such coding is away from the corresponding head-block signal, and also rendering the signal control means at the opposite end of the stretch ineffective to control the direction of coding in response to its manual control.

16. In a coded track circuit signaling system for railroads, a stretch of single track between two passing sidings and divided into a plurality of track sections, a head-block signal at each end of the stretch for governing the passage of traffic into the stretch, code transmitting and receiving means for the respective track sections normally cooperating to provide driven code pulses in a predetermined prevailing direction over the track rails of each track section and acting in response to the cessation of driven code pulses in the prevailing direction in that track section to provide reverse driven code pulses in the opposite direction, said code transmitting means for each of said track sections also acting at times to provide inverse code pulses during the off intervals of the driven code in that track section, each of said code transmitting means except those for the extreme ends of the stretch being governed by the code receiving means for the adjacent end of the next adjoining track section, signal control means for each head-block signal selectively controlled manually from a distant control office for governing the clearing of that signal and for stopping transmission of driven code pulses in the prevailing direction in those track sections where the direction of such coding is away from that signal, thereby establishing driven code pulses in each track section toward said signal, each of said signal control means also governing the transmission of inverse code pulses in said track sections to render the other signal control means at the other end of the stretch ineffective to control the direction of driven code pulses in response to its manual control.

17. In a coded track circuit signaling system for single track railroads, a stretch of track divided into a plurality of track sections with head-block signals at each end for governing the entrance of traffic into the stretch, code transmitting and receiving means for the respective track sections cooperating to provide for the transmission of driven code pulses in either selected direction through the stretch for governing the indications of a selected one of said head-block signals at any one time and also to at times provide for the transmission of inverse codes in a direction opposite to said driven codes in the respective track sections, signal control means for each head-block signal manually controlled from a remote office for selectively determining that the direction of driven code transmission through the stretch shall be toward the corresponding head-block signal and acting to stop driven code transmission away from that head-block signal, said signal control means also acting to govern its signal to indicate clear dependent upon the reception of driven codes at the corresponding end of the stretch, means at each head-block signal for controlling the transmission of inverse codes in the sections of the stretch when that head-block signal is governed to indicate clear, and means at each head-block signal governed by the inverse codes transmitted towards that signal for rendering its associated manually controlled signal control means ineffective to stop the transmission of driven code away from that head-block signal when the opposing head-block signal is governed to indicate clear or when a train is in the stretch.

18. In a coded track circuit signaling system for single track railroads, a stretch of single track divided into a plurality of track sections with a head-block signal at each end for governing traffic in opposite directions into said stretch and with intermediate signals located at intervals in the stretch, code transmitting and receiving means for the respective track sections cooperating to provide for the transmission of driven code pulses in either direction to govern the indication of the head-block signal and the intermediate signals for one direction or the other and also to provide at times for the transmission of inverse code pulses in a direction opposite to said driven codes in said track sections, signal control means for each head-block signal manually controlled from a remote office for selectively determining that the direction of driven code transmission in each track section of the stretch shall be toward the corresponding head-block signal, said signal control means also acting to govern its signal to indicate clear dependent upon the reception of driven codes at the corresponding end of the stretch, means at each head-block signal for controlling the transmission of inverse codes in the sections of the stretch if that head-block signal is governed to indicate clear, and means at each head-block signal governed by the inverse codes transmitted towards that signal for rendering its associated manually controlled signal control means ineffective to change the existing direction of driven code transmission if the opposing head-block signal is governed to indicate clear or when a train is in the stretch, whereby the cleared condition of either head-block signal and the intermediate signals for the same direction of traffic cannot be affected by the attempted manual control of the signal control means for the opposing head-block signal, and whereby the presence of a train in the stretch prevents the manual control of the signal control means for the head-block signal in advance of such train from putting to stop of an intermediate signal ahead of such train.

19. In a coded track circuit signaling system for a stretch of single track between the ends of passing sidings and including an end track section at each end of the stretch, a head-block signal at each end of the stretch governing train movement into the stretch, code transmitting means normally operating to transmit driven code pulses over the track rails of each end track section away from the corresponding head-block signal, signal control means for each head-block signal selectively controlled manually from a distant control office for conditioning that signal to clear and for stopping transmission of the code pulses normally being transmitted toward the other end of the stretch, and means governed by code pulses over the track rails of said stretch for rendering the signal control means for either end of the stretch ineffective to stop transmission of the driven code pulses being normally transmitted from that end of the stretch when the signal control means for the opposite end of the stretch has been made effective by manual control or the stretch is occupied.

20. In a coded track circuit signaling system for a stretch of single track between the ends of passing sidings divided into track sections and including an end track section for each end of the stretch, a signal at each end of the stretch governing train movement into each stretch, means normally transmitting driven code pulses over each end track section away from the associated signal, signal control means for each signal selectively controlled manually from a distant control office for conditioning that signal to clear and for cutting off the code pulses being transmitted from the corresponding end of the stretch, means responsive to the cessation of driven code pulses being normally transmitted in a given end track section for governing the transmission of inverse code pulses during the off intervals of the driven code pulses in the other end track section, and means controlled by the reception of inverse code pulses at a given end of the stretch for rendering the associated signal control means ineffective to cut off the normal driven code pulses in the corresponding end track section.

21. In a coded track circuit signaling system for a stretch of single track between the ends of passing sidings divided into a plurality of track sections, a head-block signal at each end of the stretch, intermediate signals at the ends of said track sections for governing train movement into and through the stretch in either direction, code transmitting means for each end of each track section for transmitting driven code pulses toward the opposite end, code receiving means for each end of each track section for governing the indication of the corresponding signal and the code transmitting means for the adjoining end of the next adjacent track section, said code transmitting means associated with each head-block signal normally acting to transmit driven code pulses away from that signal, signal control means for each end of the stretch selectively governed manually from a distant control office for conditioning the head-block signal at the corresponding end of the stretch to clear in response to the reception of code pulses and also for cutting off the transmission of driven code pulses away from that end of the stretch, and means governed by the transmission of code pulses over the track sections of said stretch for rendering said signal control means at either end ineffective to cut off the transmission of driven code pulses from that corresponding end when the signal controlling means for the opposite end of the stretch has been rendered effective by manual control or a train is travelling over the stretch toward said corresponding end.

22. In a coded track circuit signaling system for a stretch of single track between the ends of passing sidings divided into a plurality of track sections including an end track section at each end of the stretch and an intermediate track section, a head-block signal at each end of the stretch and intermediate signals at the ends of said intermediate track section for governing train movement into and through said stretch in either direction, code transmitting and receiving means for each end of the respective track sections normally cooperating to provide driven code pulses in a predetermined prevailing direction over the track rails of each track section and inverse code pulses during the off intervals of the driven code pulses in the intermediate track section, said normal prevailing direction driven code pulses in said end track sections being away from the corresponding end of the stretch, means associated with the end of each track section normally receiving driven code pulses and responsive to the cessation of such code pulses for providing reverse driven code pulses in the opposite direction only if driven code pulses are being transmitted in the same direction in the next adjoining track section, means associated with each end of said intermediate track section and responsive to the cessation of coding being received at the end for governing the transmission of inverse code pulses in the end track section adjoining that end of said intermediate track section, signal control means for each head-block signal for conditioning that signal to clear in response to the reception of driven code pulses and for stopping transmission of driven code pulses in the normal prevailing direction away from that signal, means manually controlled from a distant control office for selectively governing the energization of said signal control relays, means for each end of the stretch governed by the reception of inverse code pulses at that end for rendering the associated signal control means ineffective.

23. In a coded track circuit signaling system, the combination with a track section, code transmitting means at each end of said track section including a code transmitting relay for at times connecting a source of energy to the track rails, said code transmitting means at one end being normally effective to transmit driven code pulses in a prevailing direction through said section, code receiving means at the other end responsive to the normal driven code to maintain its associated code transmitting means inactive but effective upon the cessation of said normal driven code to complete a circuit intermittently closed for the associated transmitting relay to thereby transmit a reverse driven code in a direction opposite to said prevailing direction, directional means associated with said other end of said track section and initially rendered effective in response to a train entering said section at that end, and maintained effective until said normal driven code is again received by the associated code receiving means for opening said circuit for said code transmitting relay to thereby prevent a reverse driven code from being applied in the rear of a train passing through said section from said other end.

24. In a coded track circuit signaling system for a stretch of single track between the ends of passing sidings divided into a plurality of track sections, code transmitting means and code receiving means for said track sections normally cooperating to provide driven code pulses in a predetermined prevailing direction over the track rails of each track section and responding to cessation of driven code pulses in said prevailing direction to provide reverse driven code pulses in the opposite direction, said code transmitting means comprising a transmitter relay having an energizing circuit including intermittently operated coding contacts, and a directional relay associated with the end of each track section normally receiving driven code pulses in said prevailing direction and energized while the associated track section is occupied by a train entering that track section at that end, each of said directional relays opening at its back contact the energizing circuit for the associated transmitter relay.

25. In a coded track circuit signaling system, a stretch of track adjoining a passing siding and connected thereto by a track switch, a detector track section associated with said track switch, a head-block signal governing the entrance of traffic into said detector track section and over said stretch in one direction, code transmitting means at said one end of said stretch normally effective to transmit driven code pulses over said stretch toward the other end, when said signal is at stop, manually controlled means for at times rendering said code transmitting means ineffective and governing the clearing of said head-block signal, and circuit means effective while a train is in said detector track section to put said signal to stop and also maintain said code transmitting means ineffective.

26. In a coded track circuit signaling system, a stretch of track adjoining a passing siding and connected thereto by a track switch, a detector track section associated with said track switch, a head-block signal governing the entrance of traffic into said detector track section over said stretch in one direction, a signal at the other end of said stretch for governing traffic in the opposite direction over said stretch, code transmitting means at said one end of said stretch normally effective to transmit driven code pulses over said stretch toward said other end to govern the indications of said signal at such other end, signal control means associated with said head-block signal for governing the clearing of said head-block signal and including a stick relay acting when energized to render said code transmitting means ineffective, circuit means manually controlled from a remote office for initially energizing said stick relay, and stick circuit means for said stick relay including contacts governed by said detector track section to momentarily open such stick circuit only when a train leaves such section.

27. In a coded track circuit signaling system, a section of track adjacent a passing siding and connected thereto by a track switch, a detector track circuit section associated with said track switch, a head-block signal governing the entrance of traffic into said detector track circuit section and over said adjacent track section in one direction, a signal at the remote end of said adjacent section for governing traffic in the opposite direction, code transmitting means at each end of said adjacent section for transmitting driven codes towards the opposite end to govern the signal at that end, said transmitting means at the end adjacent said track switch normally operating to transmit driven codes towards said signal at the remote end, and said transmitting means at the remote end being rendered effective to transmit a reverse driven code upon the cessation of said normal driven code, manually controlled means associated with said head-block signal for at times rendering the associated code transmitting means ineffective and governing the clearing of said head-block signal dependent upon the reverse driven code received at that end of said adjacent section, and circuit means acting while a train is in said detector track section to maintain ineffective said code transmitting means at the corresponding end of said adjacent track section.

28. In a coded track circuit signaling system for a siding section opposite a passing siding having a switch at each end, code transmitting means and code receiving means for each end of said siding section normally cooperating to transmit driven code pulses in a predetermined prevailing direction and operable upon cessation of such normal code pulses to transmit driven code pulses in the opposite direction, a signal at each end of the siding section governing train movement into that section, signal control means for each signal selectively controlled from a distant control office for conditioning the associated signal to clear in response to the reception of driven code pulses, switch position controlling means for each switch manually controlled to a normal or reverse position from said control office, and means associated with the signal control means for the end of said siding section normally transmitting driven code pulses and governed by the associated switch control means for stopping transmission of the normal code pulses in response to manual control to condition the associated signal to clear only if the associated switch is controlled to the normal position.

29. In a coded track circuit signaling system for a siding section associated with a passing siding and having a switch at each end, an entering signal at each end of said siding section governing train movement into that section, code transmitting means and code receiving means for the opposite ends of said siding section and normally cooperating to provide driven code pulses in a predetermined prevailing direction and operation automatically upon cessation of said normal driven code pulses to provide driven code pulses in the opposite direction, switch position control means for each switch manually controlled from a distant control office, signal control means for each signal manually controlled from said control office for conditioning that signal to clear in response to the reception of driven code pulses, one of said signal control means for the end of said siding section normally transmitting driven code pulses acting in response to manual control to stop transmission of said normal driven code pulses and thereby cause a reversal in the direction of coding in said siding section, but only if the associated switch position control means is governed to the normal position, and means responsive to the manual control of the other signal control means and acting over the track rails of said siding section only if the associated switch position control means is governed to the normal position for rendering said one signal control means ineffective.

30. In a coded track circuit signaling system for a siding section associated with a passing siding and having a track switch at each end, an entering signal at each end of said siding section governing train movement into that section, code transmitting means and code receiving means for the ends of said siding section normally cooperating to transmit a driven code in a predetermined prevailing direction and to transmit a driven code in the opposite direction upon cessation of said normal driven code, signal control means for each of said signals selectively energized by manual control from a distant control office, one of said signal control means governing the transmission of said normal driven code and the other of said signal control means governing the transmission of inverse code pulses during the off interval of said normal driven code, switch position control means for each switch manually controlled from said control office to a normal or reverse position, and means associated with each of said signal control means for rendering it ineffective to control code transmission for the corresponding end of the siding section if the associated switch position control means is in the reverse position.

31. In a coded track circuit signaling system for a passing siding and associated siding section connected by a switch at each end, code transmitting means and code receiving means for the ends of said siding section normally cooperating to transmit driven code pulses from one end of said siding section and operable upon cessation of said normal driven code pulses to provide driven code pulses in the opposite direction, said code transmitting means and code receiving means also operating at times to transmit inverse code pulses during the off intervals between said normal driven code pulses, an entering signal for each end of said siding section governing train movement into that section, signal control means for each signal selectively energized by manual control from a distant control office to condition the associated signal to clear, switch position control means for each switch manually controlled to a normal or reverse position from said control office, means responsive to the energization of the signal control means for the end of said siding section receiving said normal driven code pulses for governing the transmission of inverse code pulses only if the associated switch position control means is in the reverse position, and means responsive to the energization of the signal control means for the opposite end of said siding section and governed by said inverse code pulses for stopping transmission of said normal driven code pulses only if the associated switch position control means is operated to the normal position and the other signal control means is inactive to clear the opposing signal.

32. In a coded track circuit signaling system for a siding section associated with a passing siding and having a track switch at each end, an entering signal at each end of said siding section governing train movement into that section, switch position control means for each switch normally controlled from a distant control office to a normal or reverse position, code transmitting means for the opposite ends of said siding section operable to transmit driven codes in one direction or the other over the track rails of said siding section, signal control means for each signal selectively controlled from said control office for conditioning the associated signal to clear and for governing the direction of transmission of driven codes in said siding section, and means for each of said signal control means for rendering it ineffective to change the existing condition of coding in said siding section if the associated switch control means is in the reverse position and also if the opposing signal is conditioned to clear.

NEIL D. PRESTON.